(12) United States Patent
Kikuchi et al.

(10) Patent No.: US 6,817,646 B2
(45) Date of Patent: Nov. 16, 2004

(54) VEHICLE SEAT

(75) Inventors: Nobukazu Kikuchi, Saitama-ken (JP); Kouji Tamada, Tokyo (JP); Isao Sekita, Tokyo (JP); Tetsuo Ikeda, Tokyo (JP)

(73) Assignees: Honda Giken Kogyo Kabushiki Kaisha, Tokyo (JP); Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/638,472

(22) Filed: Aug. 12, 2003

(65) Prior Publication Data

US 2004/0104590 A1 Jun. 3, 2004

(30) Foreign Application Priority Data

Aug. 26, 2002 (JP) .................................. 2002-244769
Aug. 26, 2002 (JP) .................................. 2002-244773
Aug. 26, 2002 (JP) .................................. 2002-244779
Aug. 28, 2002 (JP) .................................. 2002-247913

(51) Int. Cl.⁷ .................................................. B60N 2/02
(52) U.S. Cl. ............................ 296/65.05; 296/65.09; 296/65.03; 296/68.1; 297/378.12
(58) Field of Search ......................... 296/65.05, 65, 296/66, 65.13, 65.14, 68.1, 65.01, 65.03, 69, 65.11, 65.16; 297/378.12, 238, 354.13, 403, 378.13, 316, 354.12, 341, 344.1

(56) References Cited

U.S. PATENT DOCUMENTS

| | | | | |
|---|---|---|---|---|
| 4,518,201 A | * | 5/1985 | Wahlmann et al. ....... | 296/65.09 |
| 5,626,391 A | * | 5/1997 | Miller et al. ............. | 296/65.09 |
| 5,641,202 A | * | 6/1997 | Rus ......................... | 296/65.09 |
| 5,662,368 A | * | 9/1997 | Ito et al. .................. | 296/65.05 |
| 5,671,948 A | * | 9/1997 | Susko et al. .............. | 296/68.1 |
| 5,738,411 A | * | 4/1998 | Sutton et al. .......... | 297/378.12 |
| 5,795,023 A | * | 8/1998 | Kayumi ....................... | 296/69 |
| 5,826,942 A | * | 10/1998 | Sutton et al. .......... | 297/378.12 |
| 5,868,450 A | * | 2/1999 | Hashimoto ............... | 296/65.09 |
| 5,954,398 A | * | 9/1999 | Namba et al. ......... | 297/378.12 |
| 6,010,190 A | * | 1/2000 | Downey ..................... | 297/340 |
| 6,030,038 A | * | 2/2000 | Namba et al. ......... | 297/378.12 |
| 6,059,345 A | * | 5/2000 | Yokota .................... | 296/65.14 |
| 6,113,191 A | * | 9/2000 | Seibold ................... | 297/378.1 |
| 6,174,017 B1 | * | 1/2001 | Salani et al. ............. | 296/65.05 |
| 6,193,317 B1 | * | 2/2001 | Mitschelen et al. ...... | 296/65.05 |
| 6,279,982 B1 | * | 8/2001 | Nishimura et al. ...... | 296/65.09 |
| 6,371,558 B1 | * | 4/2002 | Couasnon ................ | 297/378.1 |
| 6,568,756 B2 | * | 5/2003 | Sugimoto et al. ........ | 296/65.05 |
| 6,648,393 B1 | * | 11/2003 | Milnar et al. ............ | 296/65.03 |
| 6,676,216 B1 | * | 1/2004 | Freijy et al. ............. | 296/65.09 |
| 6,688,666 B2 | * | 2/2004 | Neale et al. ............. | 296/65.09 |
| 6,746,083 B2 | * | 6/2004 | Drew et al. .............. | 296/65.05 |

FOREIGN PATENT DOCUMENTS

| | | | |
|---|---|---|---|
| JP | 54-129620 | | 10/1979 |
| JP | 63-121143 | | 8/1988 |
| JP | 1-58330 | | 4/1989 |
| JP | 04102407 A | * | 4/1992 |
| JP | 5-45544 | | 11/1993 |

* cited by examiner

Primary Examiner—Kiran Patel
(74) Attorney, Agent, or Firm—Browdy and Neimark, P.L.L.C.

(57) ABSTRACT

A vehicle seat of fold-down type which allows simultaneous flipping over of both seat back and seat cushion to their respective positions via an interlocking mechanism. The interlocking mechanism is operatively connected between the seat back and seat cushion, so that, for instance, upon folding the seat back down to a horizontal storage position, the seat cushion is automatically flipped over upwardly to an upright use position, without contact and interference therebetween. A seat cushion lock mechanism may be provided in such interlocking element so as to permit automatic locking and unlocking of the seat cushion to and from a vehicle body by folding the seat back downwardly and upwardly. In that fold-down seat, a headrest lock mechanism may be provided such that operation of a seat back lock mechanism causes quick operation of the headrest lock mechanism to unlock the headrest prior to the seat back being folded down.

15 Claims, 13 Drawing Sheets

VEHICLE SEAT

BACKGROUND OF THE INVENTION

1. Field of the Invention

The present invention relates to an automotive or vehicle seat including a rear seat. In particular, the invention is directed to a fold-down vehicle seat of the type wherein its seat back and seat cushion are in an interlocked relation with each other for synchronized movement, and wherein forward folding of the seat back causes simultaneous flipping over of the seat cushion in forward direction, so that the back side of the thus-fold seat cushion may be set at a horizontal storage position where the flipped-over seat cushion has been situated.

2. Description of Prior Art

Well known is a fold-down vehicle seat of this type wherein forward folding of its seat back simultaneously causes its seat cushion to fold down in the same forward direction, which is frequently used in a recreational vehicle for instance. In this particular type of seat, when a user folds down the seat back in the forward direction of vehicle, the seat cushion is automatically flipped over upwardly in the likewise forward direction, providing a space therebehind, so that the seat back is folded down into that space and stored therein, with the back wall of the seat back laying horizontally thereon to provide an extended floor that can be used as a load-carrying platform or the like.

One example of this particular seat is disclosed in the Japanese Laid-Open Patent Publication No. 54-129620, according to which, its seat cushion is pivoted at the forward end thereof on a floor of vehicle, whereas its seat back is pivoted at the lower end thereof on the floor, and a connecting rod is operatively connected between those seat cushion and seat back so as to establish an interlocking relation therebetween, so that, simultaneous with the forward folding of the seat back, the seat cushion is rotated relative to the forward end and flipped over upwardly to an upright storage position.

In this conventional fold-down seat provided with the connecting rod, however, when the seat cushion and seat back are positioned at an upright storage position and at a horizontal storage position, respectively, it is necessary to lock both seat cushion and seat back to a body of vehicle by means of locking device, otherwise, the seat cushion and seat back will be wobbled and rattled due to vibration of vehicle running on a rough road, so that an unpleasant noise might be generated therefrom.

In that respect, the connecting rod projects upwardly at the lateral side of the seat cushion near to a door of the vehicle, which is undesirably in the way of a passenger who will enter the vehicle. Further, in the case of a fold-down seat having a lock device provided in the seat cushion thereof, wherein the seat cushion can be locked to a vehicle body, it is annoyingly necessary to operate the lock device to unlock the seat cushion, prior to folding the seat back forwardly in practical use.

Also, with regard to a fold-down rear seat on which a headrest is mounted, there is the problem that, when folding its seat back forwardly, the headrest on that seat back is contacted with a seat in front thereof, as a result of which, the rear-seat seat back can not be folded down completely to a storage position on a corresponding seat cushion of the rear seat. To solve such problem, there has been known a seat wherein a headrest is in an interlocked relation with the seat back, so that folding the seat back forwardly causes simultaneous rotation of the headrest in the forward direction. For example, as disclosed in the Japanese Utility Model Publication No. 1-58330, a lock device provided in a headrest is connected via an interlocking device with another lock device provided in a seat back, so that, in response to operation of the headrest lock device to unlock the headrest from the seat back, the seat back lock device is simultaneously operated to unlock the seat back from a vehicle body. According thereto, indeed, its operability is improved and easy because a user has only to operate the headrest lock device to release both headrest and seat back for their respective locked states. But, when such lock mechanism is applied to the above-described fold-down seat of the type wherein a connecting rod is provided between seat cushion and seat back for interlocked operation, it is highly possible that, upon folding the seat back forwardly, the headrest will directly contact and interfere with the seat cushion being flipped over upwardly. Further, in some prior art seats, the headrest lock device is operated independently of the seat back lock device, and therefore, it is of a high likelihood that the seat back may be incompletely locked to the vehicle body, even though the headrest is completely locked to the seat back.

SUMMARY OF THE INVENTION

In view of the above-stated drawbacks, it is a first purpose of the present invention to provide an improved vehicle seat of the type wherein a seat back and a seat cushion can be simultaneously flipped over to their respective positions via an interlocking means, which is provided with a seat cushion lock mechanism and permits for automatic locking and unlocking operation of the seat cushion lock mechanism in conjunction with such flipping over of the set back and seat cushion, while avoiding interference with a passenger's foot.

In order to achieve such purpose, in accordance with the present invention, there is provided a vehicle seat in combination with a vehicle body, which basically comprises:

- a seat cushion rotatably provided so as to be able to be rotated or flipped over between a horizontal use position and an upright storage position;
- a seat back rotatably provided so as to be able to be rotated or flipped over between an upright use position and a horizontal storage position;
- a lock means for locking and unlocking the seat cushion to and from the horizontal use position, the lock means being provided between the seat cushion and vehicle body at a point below the seat cushion; and
- an interlocking means operatively connected with the seat back and seat cushion, the interlocking means including a biasing means for biasingly cause the seat cushion to flip over to the upright storage position, with such an arrangement that, upon folding the seat back from the upright use position down to the horizontal storage position, the lock means is automatically operated by the interlocking means to unlock the seat cushion from the horizontal use position, and thus, the seat cushion is automatically caused by the biasing means to flip over from the horizontal use position to the upright storage position.

It is a second purpose of the present invention to provide the foregoing vehicle seat without the lock means, which is still effective in avoiding a wabbling or rattling between the seat cushion and seat back.

For that purpose, the vehicle seat is basically comprised of:

- a seat cushion rotatably provided so as to be able to be rotated or flipped over between a horizontal use position and an upright storage position;
- a seat back rotatably provided with the vehicle body so as to be able to be rotated or flipped over between an upright use position and a horizontal storage position; and
- an interlocking means operatively connected with the seat back and seat cushion, the interlocking means including:
  - a biasing means for biasingly causing the seat cushion to flip over to the upright storage position, the basing means being so workable as to resiliently contract and extend in a direction;
  - a link means having one end pivotally connected with the seat back and another end pivotally connected with the biasing means; and
  - a guide means for guiding the biasing means so as to insure that the biasing means works in the direction,
  with such an arrangement that, upon folding the seat back from the upright use position down to the horizontal storage position, both link means and biasing means are moved via the guide means, thereby automatically rotating or flipping over the seat cushion from the horizontal use position to the upright storage position.

Accordingly, the biasing means effectively gives an biasing force to both of the seat back set in the horizontal storage position and the seat cushion set in the upright storage position, thereby retaining them all against movement, so that there is no wabbling and no rattling between the seat back and seat cushion even due to a vibration of the vehicle.

In this respect, preferably, the biasing means and link means may be operatively connected with the seat back and seat cushion in such a manner that, when the seat back is folded down substantially to a midway point between the upright use position and horizontal storage position, the seat cushion is quickly flipped over by the biasing and link means to the upright storage position, and, with further folding down of the seat back from the midway point to the horizontal storage position, the seat cushion is positively retained at the upright storage position under a biasing force of the biasing means.

It is a third purpose of the present invention to provide a vehicle of the same type as describe above, wherein a headrest is movably provided on the seat back, which prevents contact and interference between the headrest and the seat back.

For that purpose, the vehicle seat is basically comprised of:

- a seat back rotatably provided so as to be able to be rotated or flipped over between an upright use position and a horizontal storage position;
- a striker fixed on the vehicle body at a point corresponding to the upright use position associated with the seat back;
- a seat back lock means for locking and unlocking the seat back to and from the striker, the seat back lock means comprising;
  - an operation lever means movable in one of a locking direction to lock the seat back to the striker and an unlocking direction to unlock the seat back from the striker;
  - a latch workable for engagement with the striker;
  - a lock bracket having one end portion rotatably supported in the seat back and another end portion connected via a connecting rod with the operation lever means, wherein such one end portion is disposed above the latch; and
  - a biasing means connected between the latch and the foregoing another end portion of the lock bracket so as to not only biasingly cause the lock bracket to engage the latch, but also bias the operation lever means in the locking direction;
- a headrest rotatably provided on the seat back;
- a headrest lock means for locking and unlocking the headrest to a locked position, the headrest lock means comprising:
  - a lock piece provided with the headrest; and
  - a hook-like lock member biased by a spring in a direction to engage the lock piece, and
- an interlocking means operatively connected between the operation lever means and the hook-like lock member of the headrest lock means.

Preferably, the operation lever means may comprise an operation knob and an actuator lever portion rotatable about a center of rotation, and the connecting rod be connected with the actuator lever portion at a point near to the center of rotation, while the interlocking means be connected with the actuator lever portion at a point distant from the center of rotation, so that, when the operation knob is moved in the unlocking direction, the hook-like lock member of the headrest lock means is first disengaged from the lock piece associated with the headrest, thereby allowing the headrest to rotate from the locked position to a storage position, after which, the latch is disengaged from the striker, thereby allowing the seat back to be flipped over from the upright use position to the horizontal storage position.

Other various effects and advantages of the present invention will become apparent from reading of the description hereinafter, with reference to the annexed drawings.

PREFERRED EMBODIMENT OF PREFERRED EMBODIMENTS OF THE INVENTION

Referring to all FIGS. 1 through 27, there are illustrated exemplary modes of automotive or vehicle seats, as generally designated by (S), in accordance with the present invention, but, it should be understood that all the modes include an interlocking means (M) in common, which are modified within the gist and scopes of the invention as will be described hereinafter.

Figure 1:
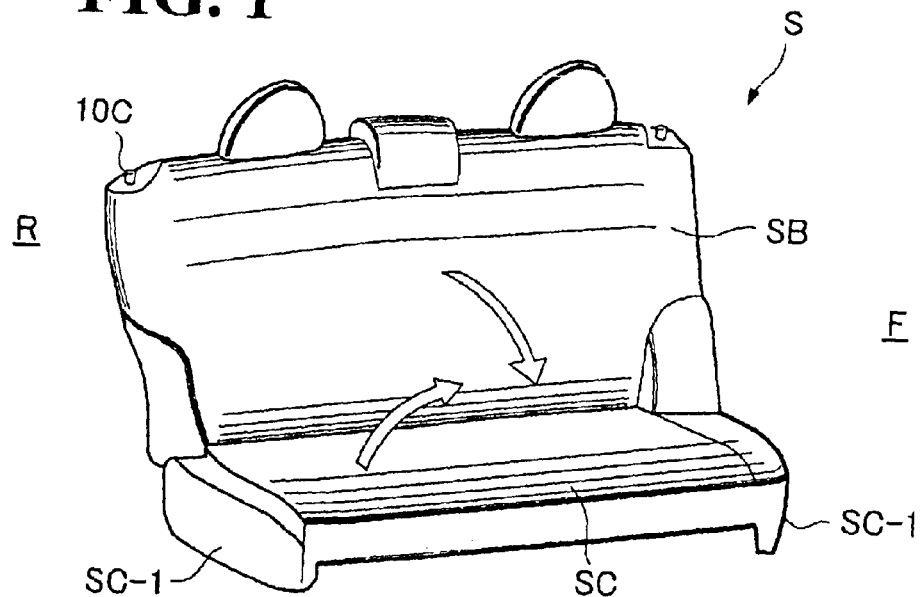
FIG. 1 is a schematic perspective view of a first embodiment of vehicle seat in accordance with the present invention.
Figure 2:
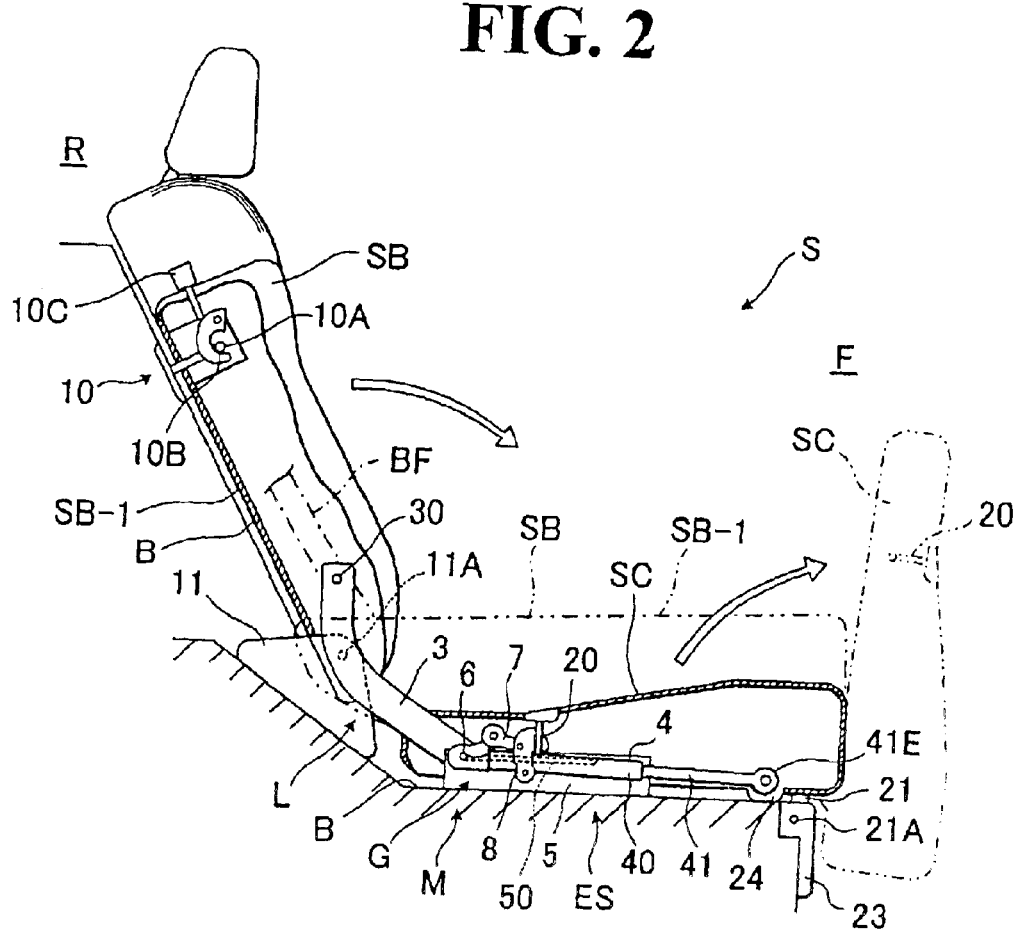
FIG. 2 is a partly broken side view of the vehicle seat.
Figure 7:
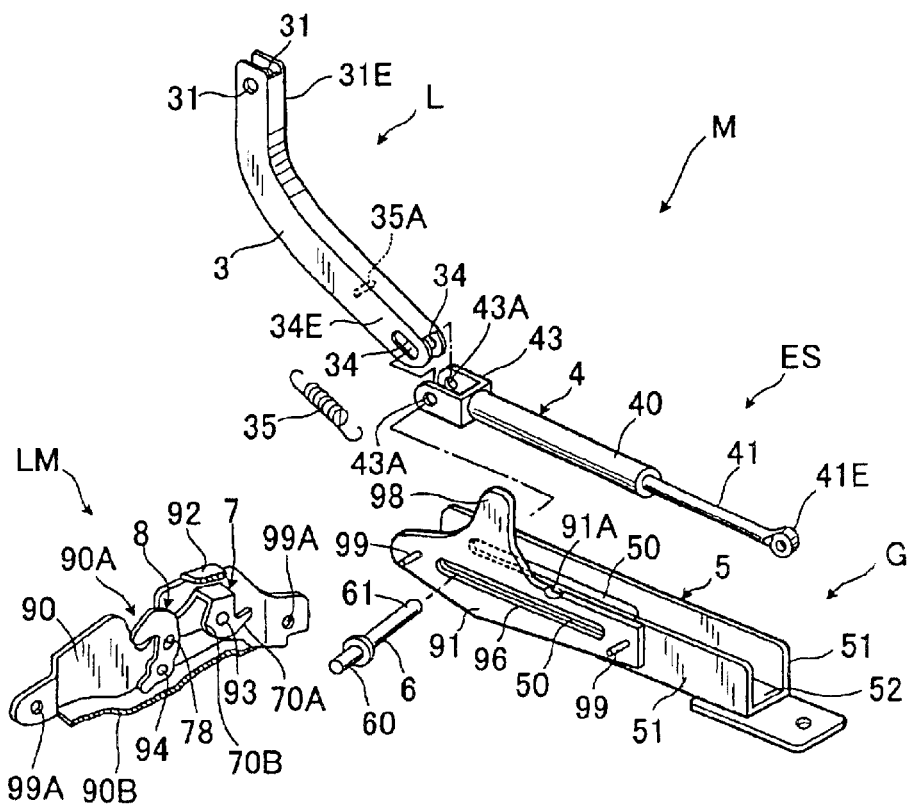
FIG. 7 is an exploded schematic perspective of the interlocking means and seat cushion lock mechanism.
Figure 8:
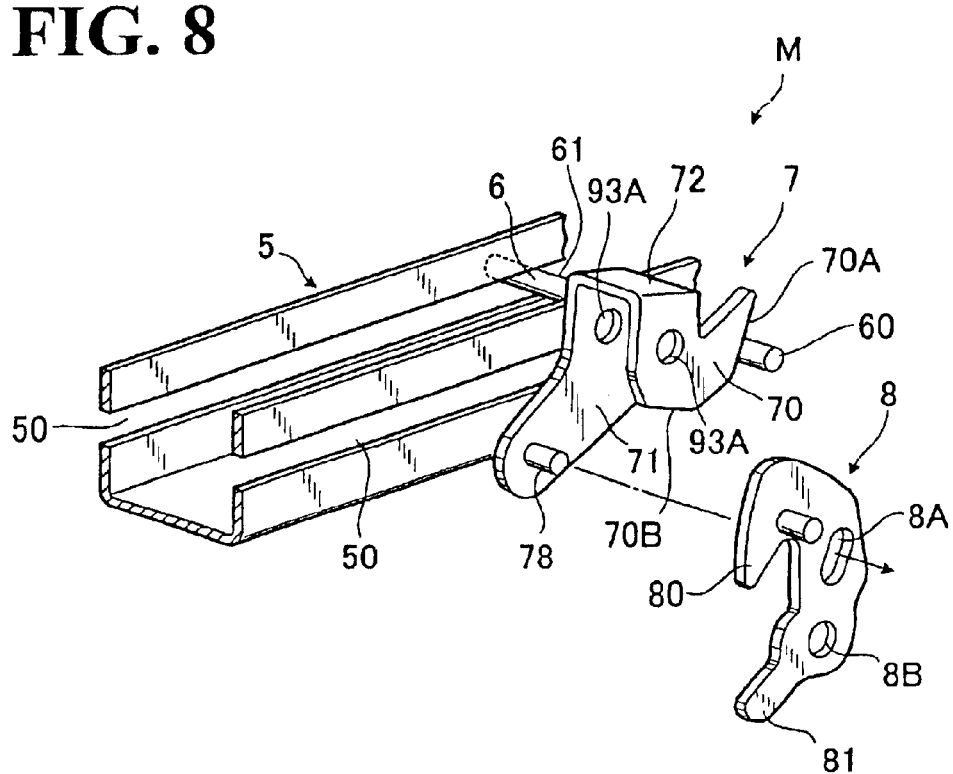
FIG. 8 is a partly broken and exploded perspective view of a slide rail member and a principal part of the seat cushion lock mechanism.
Figure 9:
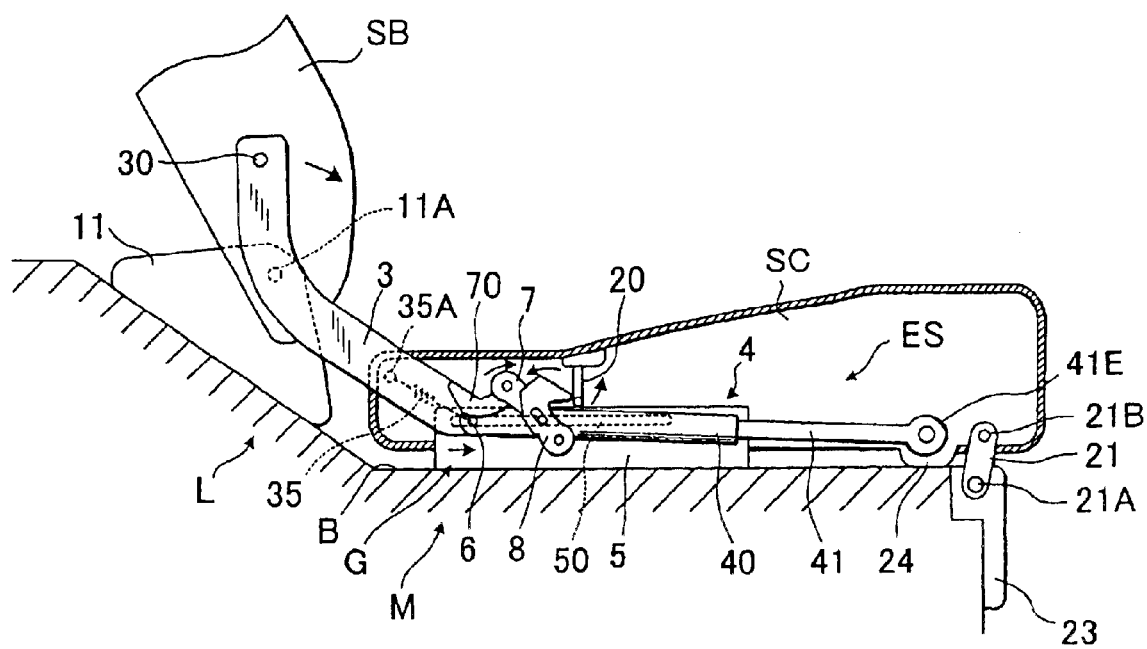
FIG. 9 is a diagram for explanatorily showing operation of the interlocking means and seat cushion lock mechanism to release the seat cushion from a locked state.

Referring now to FIGS. 1 to 11, there is illustrated a first embodiment of an automotive or vehicle seat as generally designated by (S). The illustrated seat is a rear bench-type seat comprising a seat back (SB) and a seat cushion (SC). As best shown in FIG. 9 in conjunction with FIG. 2, the seat cushion (SC) is, at its forward end, pivotally connected with a support bracket (23) by means of a hinge bracket (21), the support bracket (23) being fixed to a vehicle body (B), wherein one end of the hinge bracket (21) is pivotally connected by a second hinge pin (21B) with a frame (not shown) in the forward end of seat cushion (SC), while another end of the hinge bracket (21) is pivotally connected by a first hinge pin (21A) with the support bracket (23). Thus, the seat cushion (SC), which is now set in a horizontal use position, may be rotated or flipped over about the first hinge pin (21A) in a forward direction, i.e. a direction toward a side (F) forwardly of the seat (S), as indicated by the arrow. Also, as shown in FIG. 2, the seat back (SB) is mounted on the vehicle body (B) so as to be rotatable or foldable down relative to the lower portion thereof in the likewise forward direction (at F). Of course, both seat cushion (SC) and seat back (SB) may be rotated or flipped over in a backward direction, i.e. a direction toward a side (R) backwardly of the seat (S).

It is noted here that, in all the embodiments to be described hereinafter, the wording "in the forward direction" or the wording "forwardly" shall refer to a direction toward the forward side of the seat (S) which is designated by (F), whereas the wording "in the backward direction" and the wording "backwardly" shall refer to a direction toward the backward side of the seat (S) which is designated by (R).

As in FIG. 2, more specifically, the seat back (SB) is at its lower end portion pivotally connected via a pin (11A) to a support bracket (11) fixed on the vehicle body (B). In this respect, the seat back (SB) has a seat back frame (BF) provided therein and, strictly stated, a lower part of such seat back frame (BF) is pivotally connected via the pin (11A) to the support bracket (11), so that the seat back frame (BF) (i.e. the seat back SB) can be rotated or folded down in the forward direction (at F) relative to the pin (11A). The seat back (SB) may be locked and unlocked, at the upper back region thereof, to and from the vehicle body (B) by means of a lock mechanism (10) for the seat back (SB). The seat back lock mechanism (10) is of a known structure comprising: a striker (10A) fixed to the vehicle body (B); a hook-like lock piece (10B) rotatably provided in the seat back (SB) so as to be engageable over the strike (10A); and an operation knob (10C) connected with the lock piece (10B). Normally, as in FIG. 2, the lock piece (10B) is engaged over the striker (10A), thereby locking the seat back (SB) to the vehicle body (B). By drawing the operation knob (10C) outwardly, the lock piece (10B) is caused to rotate clockwise and thus disengaged from the striker (10A), so that the seat back (SB) is released from the locked state and may be folded down in the forward direction.

While not shown, a seat cushion frame is provided in the seat cushion (SC) as known. As understandable from FIGS. 2 and 9 and though not shown completely, it is to be noted that a pair of the hinge brackets (21) are fixed to the two lateral sides of such not-shown seat cushion frame in the seat cushion (SC), respectively, and that a pair of support brackets (23) are fixed on the vehicle body (B). Each hinge bracket (21) is rotatably connected, via a hinge pin (21A), with each support bracket (23), thereby allowing the seat cushion (SC) to be rotated or flipped over about the hinge pin (21A) from the horizontal use position indicated by the solid lines to the upright storage position indicated by the two-dot chain lines, or vice versa.

In accordance with the present invention, there is provided an interlocking means (M) between the aforementioned seat back (SB) and seat cushion (SC).

Specifically, the interlocking means (M) is basically comprised of a elastically contractible/extendable biasing mechanism (ES), a link means (L), and a guide means (G).

The elastically contractible/extendable biasing mechanism (ES) may be a pneumatic cylinder (4) (or a hydraulic cylinder). As best shown in FIG. 7, the pneumatic cylinder (4) comprises a cylindrical body portion (40) and a rod (41) movably provided in that body portion (40) such that the rod (41) is telescopically movable from and into the body portion (40) resiliently due to a compressed air pressure in the body portion (40) as is known in the art. The pneumatic cylinder (4) is also provided with a connecting bracket (43) at another end opposite to the rod (41), the connecting bracket (43) having a pair of connecting holes (43A) (43A) formed therein. As shown in FIG. 2, the end connecting end portion (41E) of the rod (41) is pivotally connected with a bracket (24) fixed in the bottom side of seat not limited to the pneumatic cylinder (4), but instead thereof, it may comprise a spring element of the type wherein a compression coil spring is wound about a rod portion.

The link means (L) may comprise a link member (3) of generally "L" shape and a slide pin (6). The link member (3) is formed with a pair of connecting holes (31) (31) in the upper end (31E) thereof and also formed with a pair of elongated connecting holes (34) (34) in the lower end (34E) thereof.

The guide means (G) may comprise a guide rail member (5) of generally U-shaped cross-section having a horizontal bottom wall (52) and a pair of vertical walls (51) (51) extending upwardly therefrom. The guide rail member (5) is fixed, at the bottom wall (52) thereof, on the vehicle body (B) (or a floor of vehicle), so as to extend longitudinally thereon. Each of the two vertical walls (51) of guide rail member (5) has a long guide slot (50) formed therein, the guide slot (50) extending along the longitudinal direction thereof.

The slide pin (6) has a contact portion (60) and a slide portion (61) as shown in FIG. 7. As will be explained, the slide portion (61) of the slide pin (6) is adapted to be slidingly movable in and along the two guide holes (50) of the foregoing guide rail member (5). On the other hand, the contact portion (60) serves as a contact means adapted to contact and rotate a rotary actuator member (7) as will be explained.

As understandable from FIGS. 2 and 7, the slide portion (61) of slide pin (6) is inserted through one of the two guide slots (50) of the rail member (5), two connecting holes (43A) of the pneumatic cylinder (4), and two elongated connecting holes (34) of link member (3). Then, after having inserted the slide pin slide portion (61) through another of the two guide holes (50), the free end of that slide portion (60) is engaged with a nut or the like, or may be riveted, though not shown, whereupon all the pneumatic cylinder (4), link member (3) and guide rail member (5) are movably and operatively connected with one another via the slide pin (6). It is therefore seen that the whole of the pneumatic cylinder (4) extends alongside of the vertical wall (51) of the guide rail member (5). On the other hand, the upper end portion (31E) of the link member (3) is pivotally connected with the seat back frame (BF) by inserting a pin (30) through the two connecting holes (31) and then fastening the pin (30) to the seat back frame (BF), as can be seen from FIGS. 2 and 7.

Designation (35) denotes a spring adapted to prevent wobbling or rattling between the link member (3) and pneumatic cylinder (4). Namely, the spring (35) is connected with a pin (35A) fixed in the link member (3) at one end thereof and also connected with the slide pin (6) at another end thereof so as to bias the lower end (34E) of link member (3) toward the connecting bracket (43) of the pneumatic cylinder (4) to biasingly bring one edge of each elongated connecting hole (34) to contact with the slide portion (61) of slide pin (6), so that any play is eliminated between the elongated connecting hole (34) and the slide pin free end portion (61). Hence, there is no rattling and wabbling in the present interlocking means (M).

On the other hand, as shown in FIG. 2, a striker (20) is fixed to the inner surface of the upper seating side of the seat cushion (SC) and pendent therefrom. Designation (LM) represents a seat cushion lock mechanism provided in a locking/unlocking relation with the striker (20) to permit locking and unlocking the seat cushion (SC) to and from the vehicle body (B). The striker (20) is a part of the seat cushion lock mechanism (LM).

The seat cushion lock mechanism (LM) comprises: a base plate member (91); a support plate member (90); a rotary actuator member (7); and a rotary latch member (8). As best shown in FIG. 7, the base plate member (91) has, formed therein, a guide slot (96) which is identical in shape and size to the afore-stated guide slot (50) of the guide rail member (5), and a vertically extending cut-out portion (91A) adapted to allow ingress and egress of the foregoing striker (20) therethrough as will be explained. Further, the base plate member (91) has a pair of connecting pins (99) (99) fixed at the respective two end portions thereof. As shown, the base plate member (91) is fixed to one vertical wall (51) of the guide rail member (5), with the guide slot (96) thereof in alignment with the guide slot (50) of the guide rail member (5). Designation (98) denotes an upwardly extending guide portion which simply serves to supportively contact and guide the cylindrical body portion (41) in vertical direction so that the cylindrical body portion (41) is prevented against dislocation in a direction transversely of the guide rail member (5). On the other hand, as can be seen from FIGS. 3, 4, 6 and 7, the support plate member (90) is of substantially "⊓" shaped configuration, having a pair of connecting holes (99A) (99A) formed in the respective two end portions thereof and a pair of first and second support pins (93) (94) formed in the central body portion thereof. Also, the support plate member (90) is formed with a vertically extending cut-out portion (90A) in the upper portion thereof, the cut-out portions (90A) being adapted to allow ingress and egress of the striker (20) therethrough as will be explained. It is noted that the second support pin (94) is disposed below the cut-out portion (90A) to form a center of rotation for the rotary latch member (8) for a purpose to be set forth later. Designation (90B) denotes a lower flange portion formed in the lower end of the support plate member (90).

Figure 4:
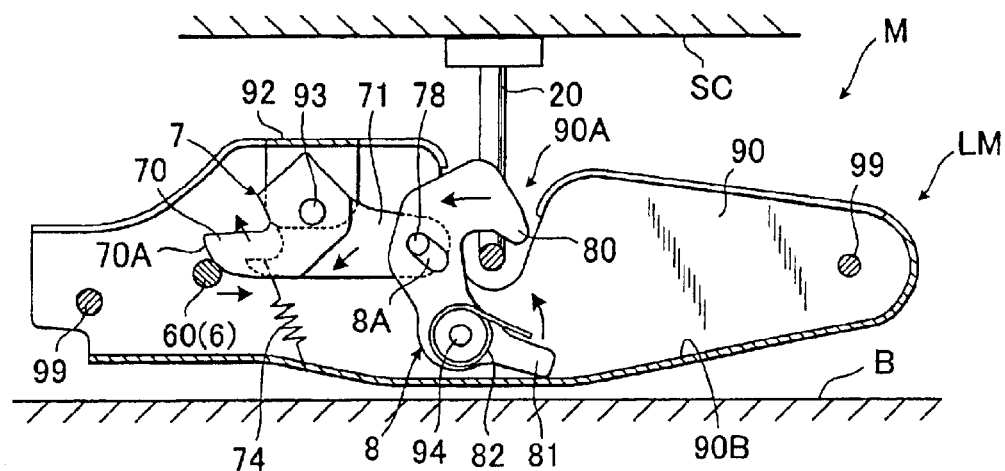
FIG. 4 is a sectional view taken along the line IV—IV in the FIG. 3.
Figure 5:
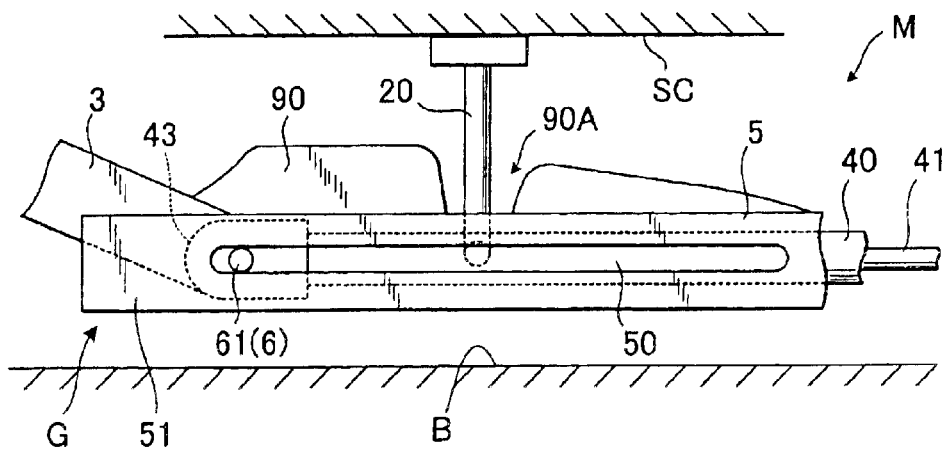
FIG. 5 is a partly broken side view of the interlocking means and seat cushion lock mechanism.
Figure 6:
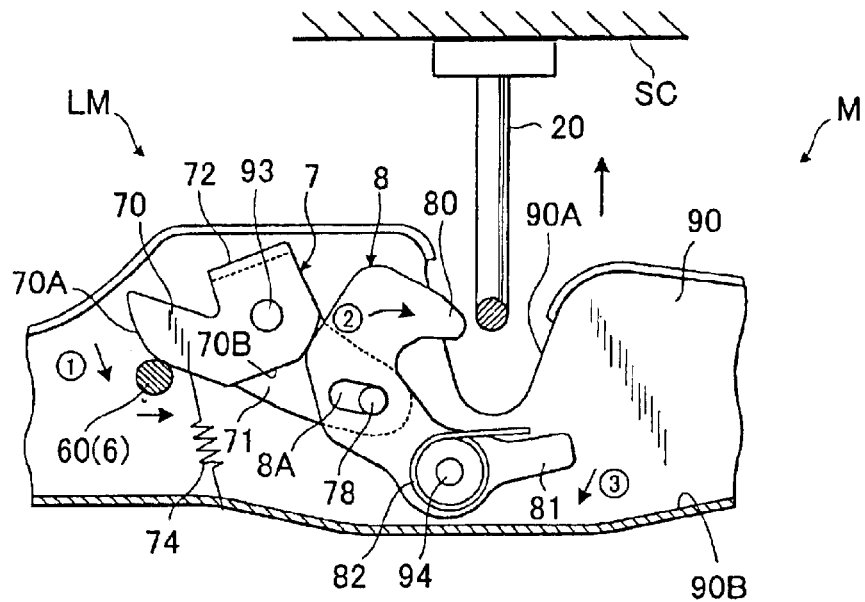
FIG. 6 is a partly broken side view of the seat cushion lock mechanism, which shows the striker as being disengaged from therefrom.

As seen in FIG. 4 and 6, the rotary actuator member (7) is so formed to have a cam portion (70) and a connecting portion (71) such that the cam and connecting portions (70) (71) are integrally connected together by a piece (72) and extend in a direction opposite to each other. As viewed from FIG. 6, the cam portion (70) has an edge that slopes upwardly in one direction (leftward), in which edge, a first cam region (70A) is defined, and also has an edge that slopes upwardly in another opposite direction (rightward), in which edge, a second cam region (70B) is defined. As best shown in FIG. 8, the connecting portion (71) has a connecting pin (78) formed in the free end portion thereof and a hole (93A) in the base end portion thereof, whereas the cam portion (70) has a hole (93A) formed in the base end portion thereof, such that those two holes (93A) are coaxially aligned with each other, through which two holes (93A), the first support pin (93) of support plate member (90) extends. Though not shown, the first support pin (93) is fixed at one end thereof to the support plate member (90), while being fixed at another end thereof to a bracket portion (92) of the support plate member (90), as can be seen from FIGS. 4 and 7. Thus, the rotary actuator member (7) is rotatably supported by that first support pin (93). Further, as shown in FIG. 4, such rotary actuator member (7) is biasingly caused by a spring (74) to rotate in the anticlockwise direction.

As in FIG. 8, the rotary latch member (8) is of the illustrated configuration having, defined therein, a hook-like latch end portion (80), an elongated hole (8A), a hole (8B) and a stopper end portion (81). The rotary latch member (8) is rotatably supported at the hole (8B) thereof by the second support pin (94) of the support plate member (90), as in FIG. 7, and is biasingly caused by a spiral spring (82) to rotate in clockwise direction, so that the stopper end portion (81) is caused to rotate in the same clockwise direction and thereby biased into contact with the lower flange (90B) of support plate (90), whereupon the rotary latch member (8) itself is normally held at the position where the hook-like latch end portion (80) thereof is normally disposed at a point substantially corresponding to the cut-out portion (90A) for engagement with the striker (20) as will be explained. Under that state, as seen in FIG. 4, both cam and connecting portions (70) (71) are in the state of extending horizontally and rectilinearly along the longitudinal direction of the support plate member (90).

Figure 3:
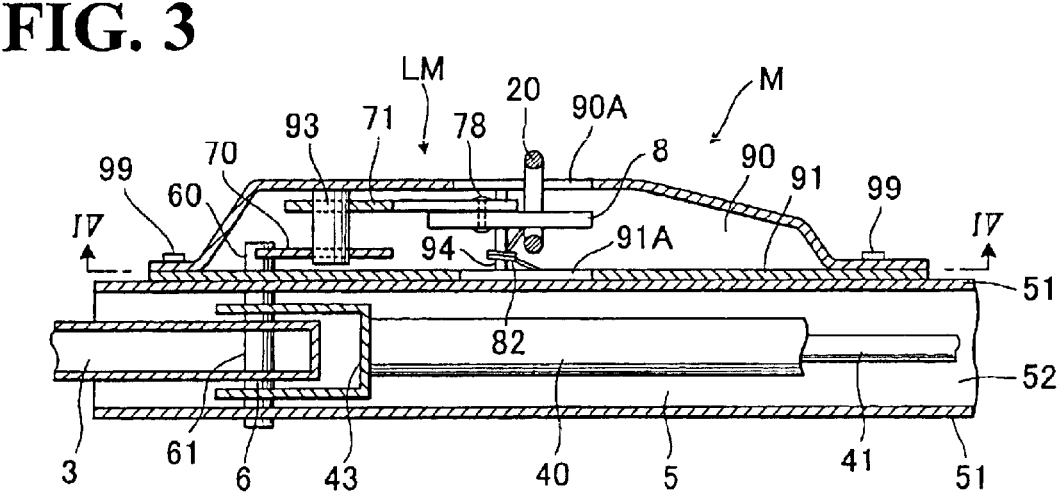
FIG. 3 is a sectional view of both interlocking means and seat cushion lock mechanism in the vehicle seat.

The support plate member (90), which is thus provided with the rotary actuator member (7) and rotary latch member (8), is securely attached to the foregoing base plate member (91) by inserting and fixing (as by riveting) the two connecting pins (99) of the base plate member (91) in the respective two connecting holes (99A) of the support plate member (90), as understandable from FIGS. 3 and 7. In this way, the seat cushion lock mechanism (LM) is securely attached to the lateral side (i.e. the vertical wall (51)) of the guide rail member (5). In this respect, as can be seen from FIG. 5, the whole heightwise-thickness of the seat cushion lock mechanism (LM) may be substantially equal to that of the guide rail member (5), thereby advantageously allowing the height of seat (S) to be reduced as required.

With regard to the stopper end portion (81), it is to be appreciated that, when the striker (20) is engaged with the rotary latch member (8), with the stopper end portion (81) of the latter in contact with the lower flange (90B), a great load applied to the seat cushion (SC) is transmitted through both striker (20) and latch member (8) and escaped through the stopper end portion (81) and both support and base plate members (90) (91) to the guide rail member (5) and thus to the vehicle body (B).

While not shown, it is to be understood that a pair of the above-described interlocking means (M) and a pair of seat cushion lock mechanisms (LM) are provided to the respective two lateral sides of seat cushion (SB). In this connection, as seen in FIG. 1, a pair of seat cushion side covers (SC-1) (SC-1) are attached to those two lateral sides of seat cushion (SB), respectively, so as to cover the respective pair of interlocking means (M) and seat cushion lock mechanism (LM).

Figure 10:
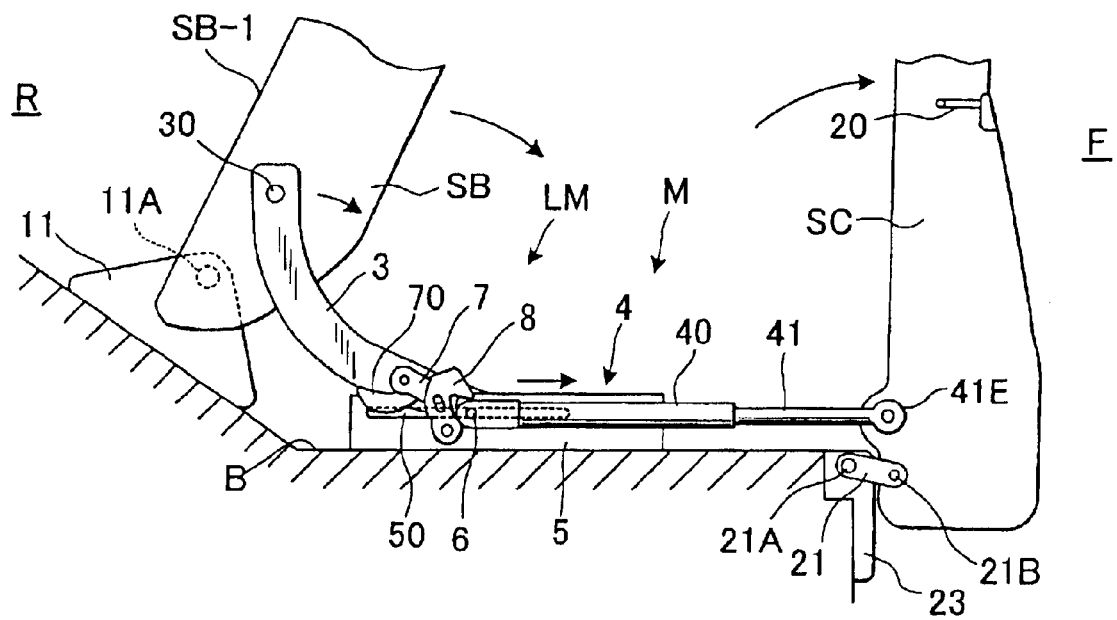
FIG. 10 is a diagram for explanatorily showing operation of the interlocking means and showing the state where the seat cushion is first flipped over to an upright storage position and then, the seat back is folded down to a horizontal storage position.

In operation, when drawing the operation knob (10C) of the lock mechanism (10) outwardly, the lock piece (10B) is caused to rotate and disengaged from the striker (10A), so that the seat back (SB) is released from the locked state and may be rotated and folded forwardly relative to the pin (11A). Then, reference is now made to FIGS. 2, 4 and 9. When a user folds or rotates the seat back (SB) forwardly about the pin (11A) as indicated by the arrow in FIG. 2, the link member (3) is rotatively displaced in the forward direction as indicated by the arrow in FIG. 9. Simultaneous therewith, the slide portion (61) of slide pin (6) is slidingly moved in and long the two guide slots (50) of the guide rail member (5) in the forward direction toward the first cam portion (70) of the rotary actuator member (7), while at the same time, the cylindrical body portion (40) is also moved forwardly along the rod portion (41). At this point, it is noted that the rod portion (41) is. shortened, because it enters the inside of the cylindrical body portion (40), thereby compressing an air therein, due to the fact that the seat back (SB) connected with that rod portion (41) is still in a locked relation with the lock mechanism (LM), with the striker (20) being engaged with the rotary latch member (8). Then, as shown in FIG. 4, the contact portion (60) of slide pin (6) is brought to contact with the first cam region (71A) of that first cam portion (70), and, with further forward movement of the slide pin contact portion (60), the rotary actuator member (7) is rotated about the first pin (93) in the clockwise arrow directions in FIG. 4, which in turn causes clockwise rotation of the connecting portion (71) of the rotary actuator member (7). As a result, as understandable from FIGS. 4 and 6, the rotary latch member (8), connected via the pin (78) with the connecting portion (71), is rotated about the second pin (94) in the anticlockwise arrow direction, thereby being disengaged from the striker (20), so that the seat cushion (SB) is released from the locked state. At this moment, as there is nothing to limit the compressed air force in the pneumatic cylinder (4), the rod portion (41) rapidly projects and extends in the forward direction from the cylindrical body portion (40) under the outwardly expanding force of the compressed air. In addition to further forward movement of the pneumatic cylinder (4), such rapid forward projection of the rod portion (41) positively pushes the forward end portion (at 24) of the seat cushion (SC) which is pivotally connected with the end portion (41E) of the rod portion (41), whereupon the seat cushion (SC) is quickly rotated and flipped over forwardly relative to the pin (21A) to the upright storage position where it stands upright as shown in FIG. 10. It is noted here that the contact portion (60) of slide pin (6) slides past both first and second cam regions (70A) (70B) in the forward direction, and therefore, the rotary actuator and latch members (7) (8) are rotated back under the biasing forces of their respective springs (74) (82) in the respective arrows ① and ② in FIG. 6, so that the rotary actuator member (7) is returned to the horizontally and rectilinearly extending state, while the rotary latch member (8) is returned to the vertically extending state, as understandable from FIG. 4. In this context, it is important that the foregoing quick flipping over of seat cushion (SC) to the upright storage position must be completed before the seat back (SB) is contacted with the seat cushion (SC). For that purpose, the seat cushion lock mechanism (LM) should be arranged on the guide rail member (5) such that the slide pin contact portion (60) is to contact and push the cam portion (70) of actuator plate member (7) for disengagement of the latch plate member (8) from the striker (20) when the seat back (SB) is folded forwardly by a certain angle, so as to insure avoiding its contact with the seat cushion (SC) or avoids its interference with the foregoing flipping over of seat cushion (SC). In this regard, FIG. 10 shows the seat back (SB) as being inclined forwardly by that certain angle, at which point, the slide pin contact portion (60) slides past the rotary actuator member cam portion (70), causing clockwise rotation of the same (70), whereupon the rotary latch member (8) is rotated and disengaged from the striker (20) and therefore the seat cushion (SC) is quickly flipped over to the upright storage position by the pneumatic cylinder (4) before contact with the seat back (SB) which is being folded down.

Now that the seat cushion (SC) is set in the upright position as in FIG. 10, the rod portion (41) of the pneumatic cylinder (4) stops there and is retained against forward movement. With further forward folding of the seat back (SB) down to the vehicle body (B), the cylinder portion (40) is moved forwardly along the rod portion (41). In other words, that particular rod portion (41) withdraws into the inside of the cylinder portion (40) and is shortened, so that the seat back (SB) is further rotated forwardly and folded down onto the area of vehicle body (B) or a horizontal storage position where the seat cushion (SB) has been set as its horizontal use position, as indicated by the two-dot chain line in FIG. 2. Hence, it is seen that the back side (SB-1) of the thus-folded-down seat back (SB) is exposed outwardly and lies horizontally, thereby allowing its use as a flat floor or a load-carrying platform.

Figure 11:
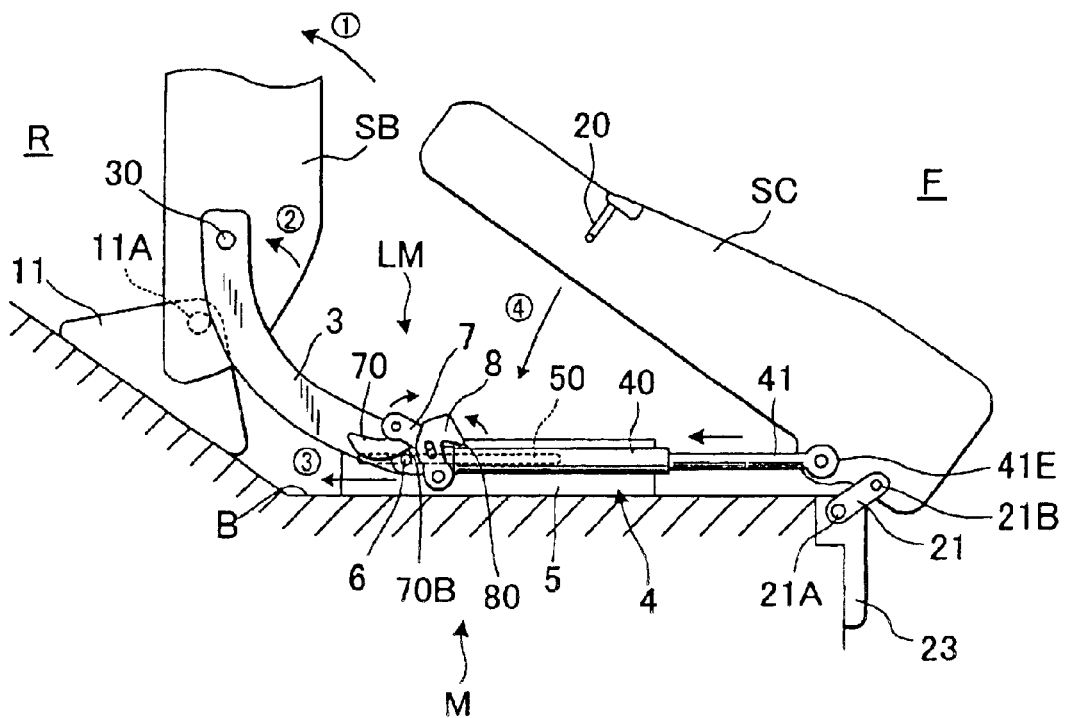
FIG. 11 is a diagram for explanatorily showing operation of the interlocking means and seat cushion lock mechanism and showing the state where the seat cushion is returned to the horizontal use position after the seat back has been returned to the upright use position in advance.

Conversely, referring to FIG. 11, when it is desired to return the thus-folded state of seat (S) into the previously described normal use state as in FIG. 2, a user has to first rotate the seat back (SB) upwardly about the pin (11A) as indicated by the arrow ① toward the upright use position. Responsive thereto, the link member (3) is simultaneously displaced in the upward direction indicated by the arrow ②, which in turn simultaneously causes the pneumatic cylinder (40) to move backwardly in the direction of the arrow ③, with the slide portion (61) of slide pin (6) moving in and along the guide slot (50). At this moment, the backward movement of cylindrical body portion (40) is accelerated relative to the rod portion (41) under an expanding force of compressed air in that cylindrical body portion (40), which means that the rod portion (41) is lengthened, thereby causing rapid backward movement of the link member (3) and thus causing the seat back (SB) to rapidly flip over in the upward direction toward the upright use position, while simultaneously drawing the forward end portion of seat cushion (SC) backwardly in order that the seat cushion (SC) is rotated backwardly from the upright storage position. In view of this fact, even though the seat cushion (SC) is being folded down as indicated by the arrow ④, the seat back (SB) is firstly displaced out of the way of the seat cushion (SC), thus insuring that the seat cushion (SC) is secondly folded down without contact with the seat back (SB). Also, the slide pin contact portion (60) is brought to contact with the second cam region (70B) of the rotary cam member (7), whereupon the rotary actuator member (7) is rotated clockwise (see the clockwise arrow in FIG. 11) to cause simultaneous anticlockwise rotation of the rotary latch member (8) (see the anticlockwise arrow in FIG. 11). As a result thereof, the seat cushion lock mechanism (LM) is placed in an unlocked state where the hook-like latch portion (80) withdraws from a point corresponding to the two cut-out portions (90A) (91A), thereby providing an opened space therein. At this moment, as the seat back (SB) and seat cushion (SC) are respectively about to return to the upright use position and the horizontal use position, the striker (20) of the seat cushion (SC) is brought to such opened space and enters both two cut-out portions (90A) (91A). Shortly thereafter, the slide pin contact portion (60) contacts and slides past the first cam region (70A), whereupon the rotary actuator member (7) is rotated anticlockwise under the biasing force of the spring (74) (see the anticlockwise arrow ① in FIG. 6), while simultaneously, the rotary latch member (8) is rotated clockwise under the biasing force of the spring (82) (see the clockwise arrow ② in FIG. 7). Accordingly, the hook-like latch portion (80) of rotary latch member (8) is engaged with the striker (20) of the seat cushion (SC), while at the same time, the hook-like lock piece (10B) of the seat back (SB) is engaged over the striker (10A) fixed to the vehicle body (B). Thus, as shown in FIG. 2, the seat back (SB) and seat cushion (SC) are respectively locked to their respective upright and horizontal use positions.

In accordance with the present first embodiment, it is appreciated that the following effects are attained:

(i) As shown in FIG. 2, the interlocking means (M) on the whole is disposed along the lateral sides of both seat back (SB) and seat cushion (SC) which are locked to the vehicle body (B) because the generally L-shaped link member (3) extends along a generally L-shaped juncture between the seat back (SB) and seat cushion (SC) and further, both guide rail member (5) and elastically contractible/extendable biasing mechanism (ES) extend alongside of the seat cushion (SC) and are disposed at a point lower than the height-wise thickness of the seat cushion (SC). In addition, such interlocking means (M) is located inside the lateral portion of seat back (SB) as well as inside the seat cushion side cover (SC-1). Thus, a whole of the interlocking means (M) does not project from the seat (S), so that a passenger can smoothly mount onto and descend from the seat (S) from a door of vehicle, without (ii) The seat cushion (SC), when in such use position as in FIG. 2, is positively locked by the seat cushion lock mechanism (LM) to the side of vehicle body (B). Such provision of lock mechanism is effective in avoiding rattling and wabbling in the seat cushion in this particular fold-down seat (S).

(iii) The seat cushion lock mechanism (LM) is operatively connected with the interlocking means (M). Namely, the forward and backward movement of the slide pin (6) forming one element of the interlocking means (M) acts upon the rotary actuator member (7) to cause rotation of the rotary latch member (8) in a direction for disengagement from the striker (20) of seat cushion (SC) or to provide the opened side at a point corresponding to the two cut-out portions (90A) (91A). Hence, by simply rotating the seat back (SB) forwardly and backwardly, the seat cushion (SC) is automatically flipped over in the forward and backward directions and also automatically locked and unlocked by such combination of the interlocking means (M) and lock mechanism (LM) to and from the side of vehicle body (B).

Figure 12:
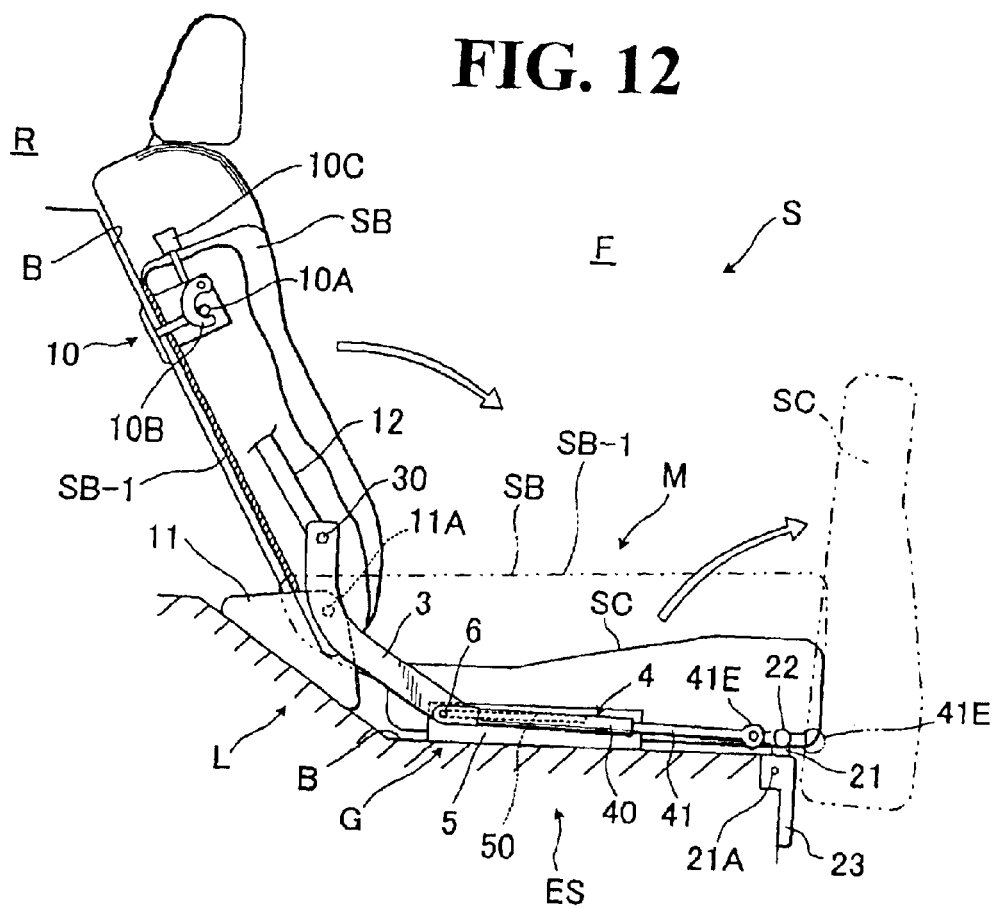
FIG. 12 is partly broken side view of a second embodiment of the vehicle seat in accordance with the present invention.
Figure 13:
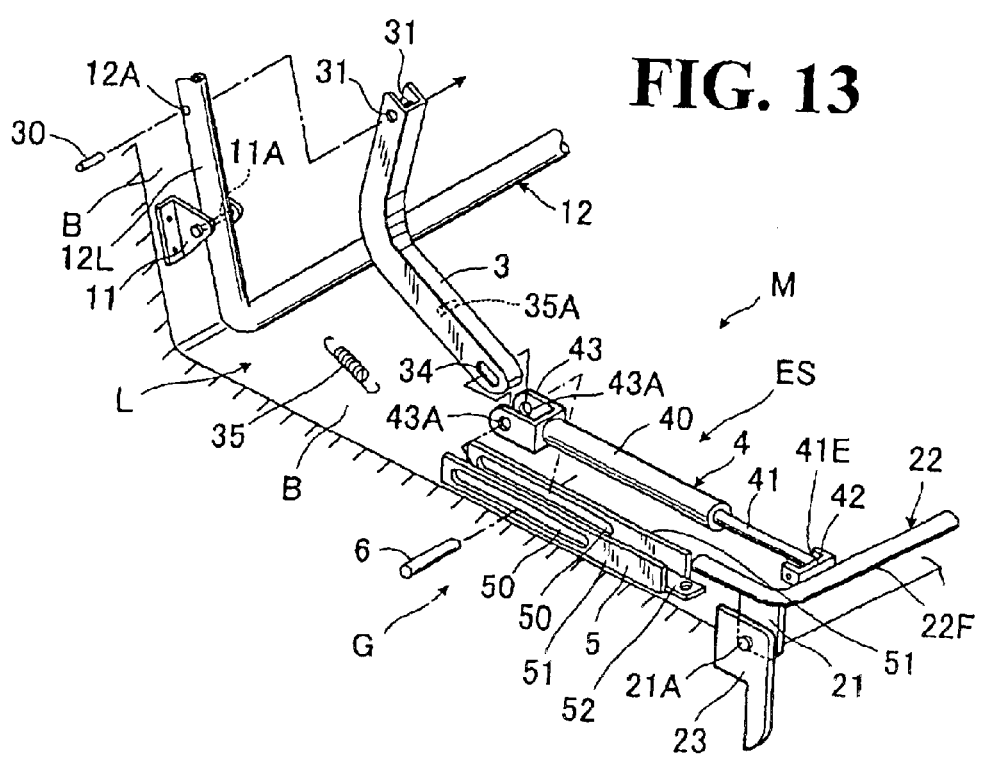
FIG. 13 is a partly broken and exploded perspective view showing principal parts of the interlocking means of the second embodiment of the present invention.

Referring now to FIGS. 12 to 17, there is illustrated a second embodiment of the present invention. This particular embodiment is basically identical in structure to the above-described firs embodiment, except that there is no lock mechanism equivalent to the seat cushion lock mechanism (LM) described in the first embodiment. As similar to the first embodiment, the illustrated seat (S) is a rear bench-type seat comprising a seat back (SB) and a seat cushion (SC). As can be seen from FIG. 13 in conjunction with FIG. 12, the seat back (SB) and seat cushion (SC) are respectively provided with a seat back frame (12) and a seat cushion frame (22) therein. As best shown in FIG. 13, the seat cushion (SC) is, at its forward end, pivotally connected with a support bracket (23) by means of a hinge bracket (21), the support bracket (23) being fixed to a vehicle body (B), wherein one end of the hinge bracket (21) is fixed to the forward end of the seat cushion frame (22) and another end of the same (21) is pivotally connected by a hinge pin (21A) with the support bracket (23).

As shown in FIG. 12, the seat cushion (SC) may be rotated or flipped over relative to the hinge pin (21A) in the forward direction indicated by the arrow. Also, the seat back (SB) is mounted on the vehicle body (B) so that the lower portion of the seat back may be rotated in the likewise forward direction (at F). Of course, both seat cushion (SC) and seat back (SB) may be rotated or flipped over in the backward direction.

As understandable from FIGS. 12 and 13, with regard to the seat back (SB), its seat back frame (12) is, at its lateral frame section (12L), pivotally connected via a pin (11A) with a support bracket (11) fixed on the vehicle body (B), so that the seat back frame (12) (i.e. the seat back SB) can be rotated or folded downwardly in the forward direction relative to the pin (11A). Also, the seat back (SB) may be locked and unlocked, at the upper back region thereof, to and from the vehicle body (B) by means of a seat back lock mechanism (10). The seat back lock mechanism (10) is identical to the seat back mechanism (10) of the previously described first embodiment, and any further description is omitted thereon.

While not shown completely, it is to be noted that a pair of the hinge brackets (21) are fixed to the two lateral sides of the seat cushion frame (22) and that a pair of the support brackets (23) are fixed on the vehicle body (B). Each of the hinge brackets (21) is rotatably connected, via a pin (11A), with each of the two support brackets (11), thereby allowing the seat cushion (SC) to be rotated or flipped over about the hinge pin (21A) from the horizontal normal use position indicated by the solid lines to the upright stored position indicated by the two-dot chain lines, or vice versa. Also, while not shown completely, it is to be noted that a pair of the support brackets (11) are fixed on the vehicle body (B), and therefore, the seat back frame (12) is, at the two lateral frame sections (12L) thereof, pivotally connected via two respective pins (11A) to the two support brackets (11), thereby allowing the seat back (SB) to be rotated or flipped over about the two hinge pins (11A) from the vertical use position indicated by the solid lines to the horizontal storage position indicated by the two-dot chain lines, or vice versa.

In the present embodiment, the same interlocking means (M) as in the foregoing first embodiment is provided between the seat back (SB) and seat cushion (SC). Likewise as in the first embodiment, the interlocking means (M) is basically comprised of an elastically contractible/extendable biasing means (ES), a link means (L), and a guide means (G). The elastically contractible/extendable biasing mechanism (ES) may be a pneumatic cylinder (4). Of course, the pneumatic cylinder (4) is not limitative, but such biassing mechanism (ES) may comprise a spring element of the type wherein a compression coil spring is wound about a rod portion. This pneumatic cylinder (4) is identical to the pneumatic cylinder (4) of the first embodiment, except that the end connecting end (41E) of rod portion (41) is pivotally connected via a bracket (42) with the forward frame section (22F) of seat cushion frame (22), as shown in FIG. 13. Further, likewise as in the first embodiment, the link means (L) may comprise a link member (3) of generally "L" shape and a slide pin (6), and the guide means (G) may comprise a guide rail member (5) of U-shaped cross-section. Thus, any detailed description is omitted about those elements (3, 4 and 5), and all like designations to be used hereinafter correspond to all like designations given in the foregoing first embodiment.

As shown, all the pneumatic cylinder (4), link member (3) and guide rail member (5) are movably and operatively connected with one another via the sliding pin (60), such that a whole of the link member (3) extends alongside of the vertical wall (51) of the guide rail member (5). On the other hand, the upper end portion of the link member (3) is pivotally connected with the lateral frame section (12L) by inserting a pin (30) through a connecting hole formed in that lateral frame section (12L) and the two connecting holes (31) (31) of the link member (3), as seen from FIG. 13. As similar to the first embodiment, the coil spring (35) is connected with a pin (35A) fixed in the link member (3) at one end thereof and also connected with the slide pin (6) at another end thereof so as to bias the lower end of the link member (3) toward the connecting bracket (43) to cause one edge of each elongated connecting hole (34) to contact the slide pin (6), so that any play is eliminated between the edge of connecting hole (34) and the slide pin (6). Hence, there is no rattling and wabbling in the present interlocking means (M).

Figure 14:
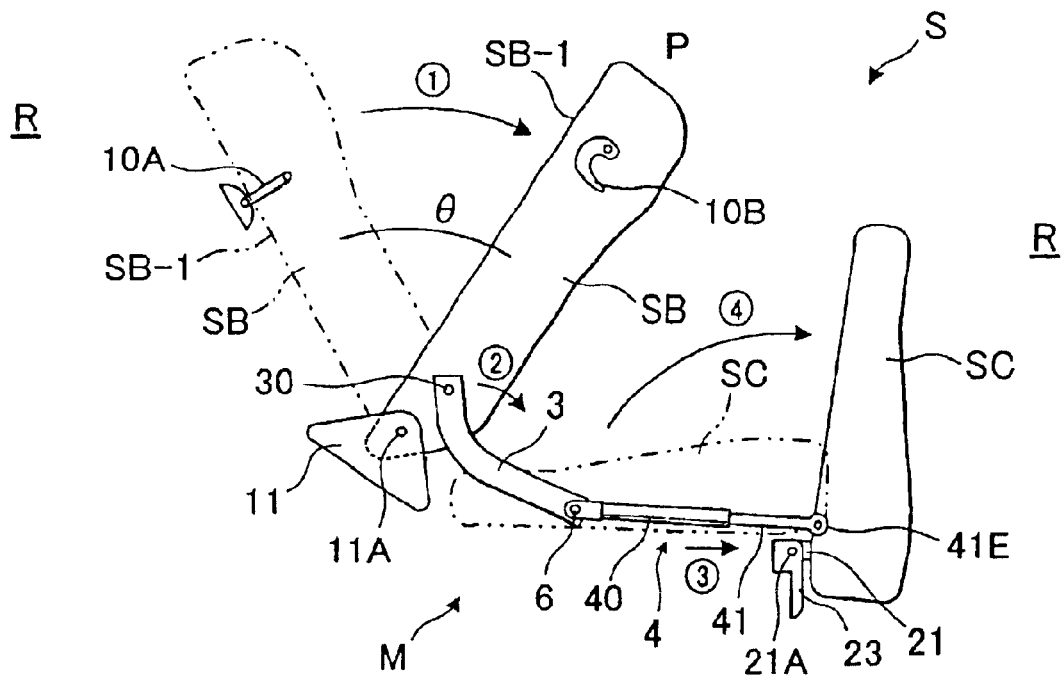
FIG. 14 is a diagram for explanatorily showing the state where, when the seat back is folded down form an upright use position to a midway point, the seat cushion is flipped over to an upright storage position.
Figure 15:
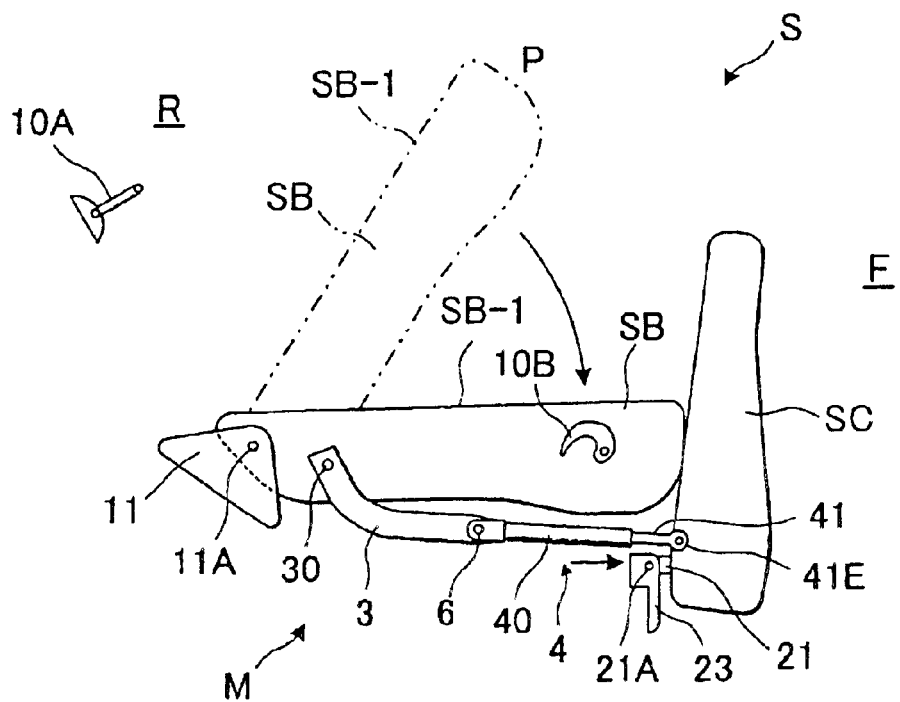
FIG. 15 is a diagram for explanatorily showing the state where the seat back is folded down from the midway point to a horizontal storage position.

In operation, reference is made to FIGS. 14, 15, 16 and 17. At first, the operation knob (10C) of the lock mechanism (10) is drawn outwardly, with the result that the lock piece (10B) is caused to rotate and disengaged from the striker (10A) and that the seat back (SB) is released from the locked state and may be rotated forwardly relative to the pin (11A). Then, when a user folds or rotates the seat back (SB) forwardly about the pin (11A) as indicated by the arrow ① in FIG. 14, the link member (3) is rotatively displaced in the forward direction as indicated by the arrow ② in FIG. 14 due to the fact that the pin (30), i.e. a rotation center of the link member (3), is disposed above the pin (11A), i.e. a rotation center of the seat back (SB). Simultaneous therewith, while not shown in FIG. 14, but as understandable from FIGS. 12 and 13, the slide pin (6) is slidingly moved in and long the two guide slots (50) of the guide rail member (5) in the forward direction ③, while at the same time, the cylindrical body portion (40) is also moved forwardly along the rod portion (41). At this point, the rod portion (41) is shortened, because it enters the inside of the cylindrical body portion (40), thereby compressing an air therein. In this connection, referring to FIG. 14, the present embodiment is of such an arrangement that, prior to the seat back (SB) being rotated or inclined to a midway point (P) by the angle of θ (about 45 degrees) from the use position indicated by the two-dot chain line, the seat cushion (SC) is completely flipped over from the horizontal use position indicated by the two-dot chain line to the upright storage position indicated by the solid line. In other words, at this moment, the rod portion (41) is biasingly caused to extend forwardly from the cylindrical body portion (40) under the outwardly expanding force of the compressed air. In addition to further forward movement of the pneumatic cylinder (4), such biased forward movement of the rod portion (41) positively pushes the forward end portion of seat cushion (SC) which is pivotally connected with the end portion (41E) of the rod portion (41), whereupon the seat cushion (SC) is immediately flipped over forwardly about the pin (21A) to the upright storage position where it stands upright as shown in FIG. 14, in advance before contact with the seat back (SB) which is being rotated forwardly to the midway point (P).

Now that the seat cushion (SC) is set in the upright storage position, the rod portion (41) of the pneumatic cylinder (4) stops there and is retained against forward movement. With further forward folding of the seat back (SB) from the midway point (P) down to the vehicle body (B), the cylinder portion (40) continues to move on forwardly along the rod portion (41). In other words, that particular rod portion (41) withdraws into the inside of cylinder portion (40) and is shortened, so that the seat back (SB) is further rotated forwardly and folded down to the horizontal storage position (i.e. the area where the seat cushion (SB) has been set), as indicated by the solid line in FIG. 15. Thus, the back side (SB-1) of the thus-folded-down seat back (SB) is exposed outwardly and lies horizontally, allowing its use as a flat floor or a load-carrying platform. Under that state, it is also appreciated that the outwardly expanding force by compressed air in the pneumatic cylinder (4) not only biases the rod portion (41) in the forward direction, thereby positively preventing the seat cushion (SC) against backward inclination at the upright storage position, but also biases both cylinder body portion (40) and link member (3) in the backward direction to the pin (30), thereby positively preventing the seat back (SB) against backward rotation about the pin (11A) at the horizontal storage position. Accordingly, the pneumatic cylinder (4) per se serves as a lock means for locking the seat back (SB) and seat cushion (SC) to the horizontal and upright storage positions, respectively, as can be seen from FIG. 15.

Figure 16:
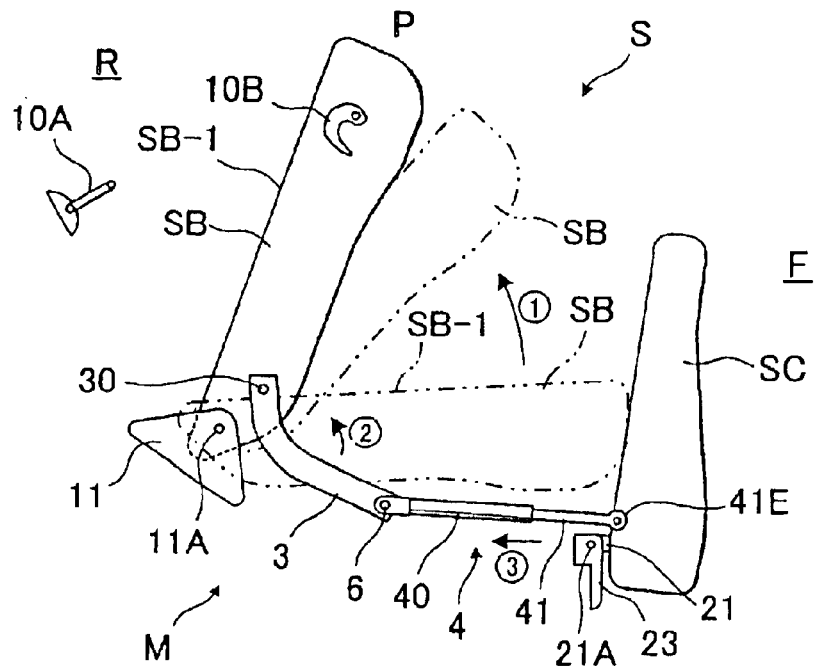
FIG. 16 is a diagram for explanatorily showing operation of the interlocking means when the seat back is folded upwardly to the midway point.
Figure 17:
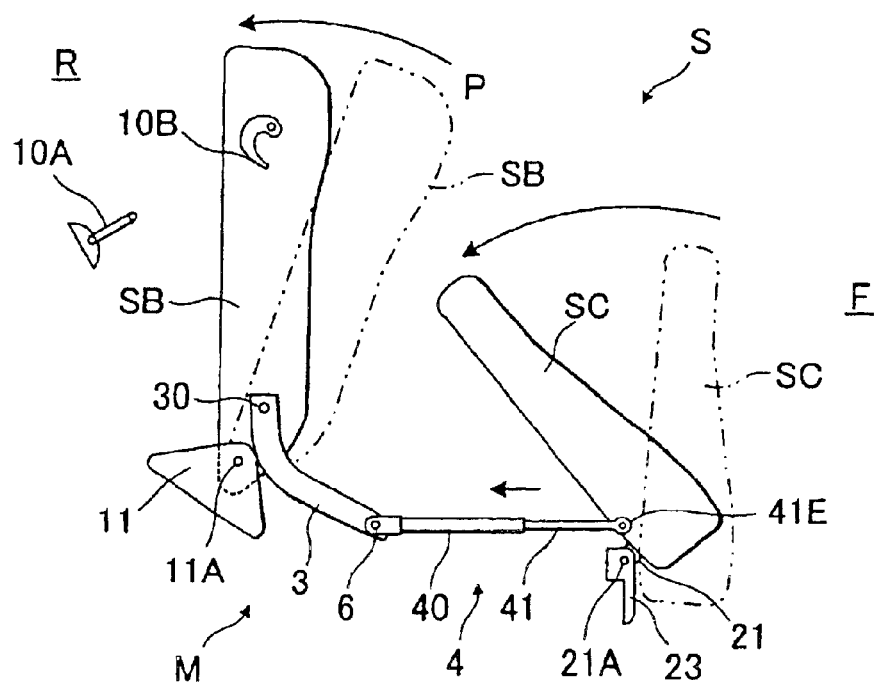
FIG. 17 is a diagram for explanatorily showing the state where, when the seat back is further folded upwardly from the midway point to the upright use position, the seta cushion is flipped over downwardly to the horizontal use position.

Conversely, referring to FIG. 16, when it is desired to return the thus-folded state of seat (S) into the normal use state shown in FIG. 12, a user has to first rotate the seat back (SB) upwardly about the pin (11A) as indicated by the arrow ① in FIG. 16. Responsive thereto, the link member (3) is simultaneously displaced in the upward direction indicated by the arrow ②, which in turn simultaneously causes the pneumatic cylinder (40) to move backwardly in the direction of arrow ③, with the slide pin (6) moving in and along the guide slots (50) though not shown. At this moment, the backward movement of cylindrical body portion (40) is accelerated relative to the rod portion (41) under an expanding force of compressed air in that cylindrical body portion (40), which means that the rod portion (41) is lengthened, thereby causing backward movement of the link member (3). Under such biasing force of pneumatic cylinder (4), when the user starts to raise the seat back (SB) from the horizontal storage position, the seat back (SB) itself is automatically and smoothly flipped over therefrom up to the midway point (P), as understandable from FIG. 16. When the seat back (SB) has reached that midway point (P), the rod portion (41) extends to a maximum length and will no longer extend from the cylindrical portion (40). Therefore, as indicated by the arrows in FIG. 17, further backward rotation of the seat back (SB) from the midway point (P) causes both link member (3) and pneumatic cylinder (4) to displace backwardly, which draws the forward end portion of seat cushion (SC) connected with the pneumatic cylinder rod portion (14), so that the seat cushion (SC) is gradually rotated or flipped over downwardly or backwardly from the upright storage position. In view of this fact, even though the seat cushion (SC) is being folded down, the seat back (SB) is displaced out of the way of the seat cushion (SC), allowing the seat cushion (SC) to be smoothly folded down without interference with the seat back (SB). Thereafter, the seat back (SB) and seat cushion (SC) are returned to their respective upright and horizontal use positions as in FIG. 12. At this point, of course, the seat back (SB) is locked to the vehicle body (B) because the lock piece (10B) of the seat back lock mechanism (10) is engaged with the striker (10A). In addition, the seat cushion (SC) is also in a locked state to the vehicle body (B) because the link member (3) as well as the pneumatic cylinder (4) connected with that seat cushion (SC) are actually coupled with the thus-locked seat back (SB), thereby retaining the seat cushion (SC) against movement and rotation from the horizontal use position.

In accordance with the present second embodiment, it is appreciated that the following effects are attained:

(i) In folding seat back (SB) down from the upright use position, the biasing force of the elastically contractible/extendable mechanism (ES) or the pneumatic cylinder (4) effectively prevents an abrupt folding down of the seat back (SB) at the point when the seat back (SB) is rotated past the midway point (P) towards the horizontal storage position.

(ii) When the seat cushion (SC) has been flipped over to and set at the upright storage position, the biasing force of the elastically contractible/extendable mechanism (ES) is also effective in retaining the seat cushion (SC) at the upright storage position against movement, hence eliminating the need to provide any lock means for locking the seat cushion (SC) to that position. Further, in view of the fact that the seat back (SB) is locked to the vehicle body (B) and both link member (3) and pneumatic cylinder (4) are coupled with that locked seat back (SB), both seat cushion (SC) and seat back (SB) are positively retained against movement so much so that no wabbling occurs therebetween even when they are subjected to vibration of a vehicle having the present seat therein.

(iii) Even though the seat cushion (SC), which is flipped over to the upright storage position, may collide or interfere with the seat back (SB) being folded down, no damage and no breakage will occur to those seat cushion and seat back by the reason that the elastically contractible/extendable mechanism (ES) serves as a buffer between them and absorb any impact and shock therefrom.

(iv) Owing to the outwardly expanding force of the elastically contractible/expandable mechanism (ES), the seat back (SB) itself is smoothly flipped over from the horizontal storage position up to the midway point (P). Thus, a user can easily lift up the seat back (SB) with a very small force from that horizontal storage position.

Reference is now made to FIGS. 18 to 23 which illustrates a third embodiment of the present invention as applied to the same fold-down seat (S) as having been described thus far. Hence, any further description is not made of the structure of seat (S) itself. In brief, as seen from both FIGS. 18 and 19, the seat cushion (SC) may be rotated or flipped over relative to the hinge pin (21A) in the forward direction indicated by the arrow, and the seat back (SB) is mounted on the vehicle body (B) so that the lower portion of the seat back (SB) may be rotated in the likewise forward direction (at F). Of course, both seat cushion (SC) and seat back (SB) may be rotated or flipped over in the backward direction as indicated by the arrow. While not shown, it should be noted that, as similar to the above first and second embodiments, the interlocking means (M) is provided between the seat back (SB) and seat cushion (SC) to provide for the synchronized simultaneous flipping over of both of those seat back (SB) and seat cushion (SC) as described previously.

The present third embodiment is directed to an interlocking arrangement between the headrest (HD) and the fold-down seat (S), using the common concept of interlocking means (M) within the gist and scopes of the present invention.

The headrest (HR) is mounted on the top of the seat back (SB) so as to be movable or inclinable in the forward direction (i.e. to the side (F)) and in the backward direction (i.e. to the side (R)). In other words, as understandable from FIGS. 19 and 21, a securing support element (120) is fixedly provided in the upper end portion of the seat back (SB). The securing support element (120) has, formed therein, a first support portion (120A), a second support portion (120B) and a third support portion (120C). As shown, the first and third support portions (120A) (120C) are disposed at a low level and at a high level, respectively, with the second support portion (120B) disposed at an intermediate level between the two support portions (120A) (120C). On the other hand, the headrest (HR) has a stay (130) whose end portion (130A) is fixed to a support pin (131) rotatably secured on the third support portion (120C) so that the headrest (HR) is rotated or inclined about that support pin (131) from the vertically extending use position indicated by the solid line to the forwardly inclined storage position indicated by the two-dot chain line, or vice versus. In this respect, as understandable from FIGS. 2 and 19, the seat cushion (SC) is opened in the bottom side thereof and hollow therein as indicated by (H). This hollow (H) serves as a storage space for allowing the forwardly inclined headrest (H) to be stored therein as will be explained later.

As shown, a biasing spring (133) is connected between the stay end portion (130A) and the securing support element (120). Under the biasing force of that spring (133), the headrest (HD) is biasingly caused to rotate clockwise or in the forward direction as indicated by the two-dot chain line of FIG. 22.

In this context, there is provided a headrest lock mechanism (200) for locking and unlocking the headrest (HD) to and from the vertically extending use position. The headrest lock mechanism (200) comprises: a hook-like latch member (121) rotatably provided on the second support portion (120B) of securing support element (120); and a lock piece (132) formed integrally with the end portion (130A) of headrest stay (130). Specifically, the hook-like latch member (121) has one end in which an engagement notch (121A) is formed for engagement with the lock piece (132) and also has another end pivotally connected by a pin (121C) with the second support portion (120B). Designation (122) denotes a biasing spring which is at one end thereof connected with the hook-like latch member (121) and also connected with the securing support element (120) at another end thereof. Under the biasing force of such spring (122), the hook-like latch member (121) is biasingly caused to rotate about the pin (121C) in clockwise direction.

Figure 21:
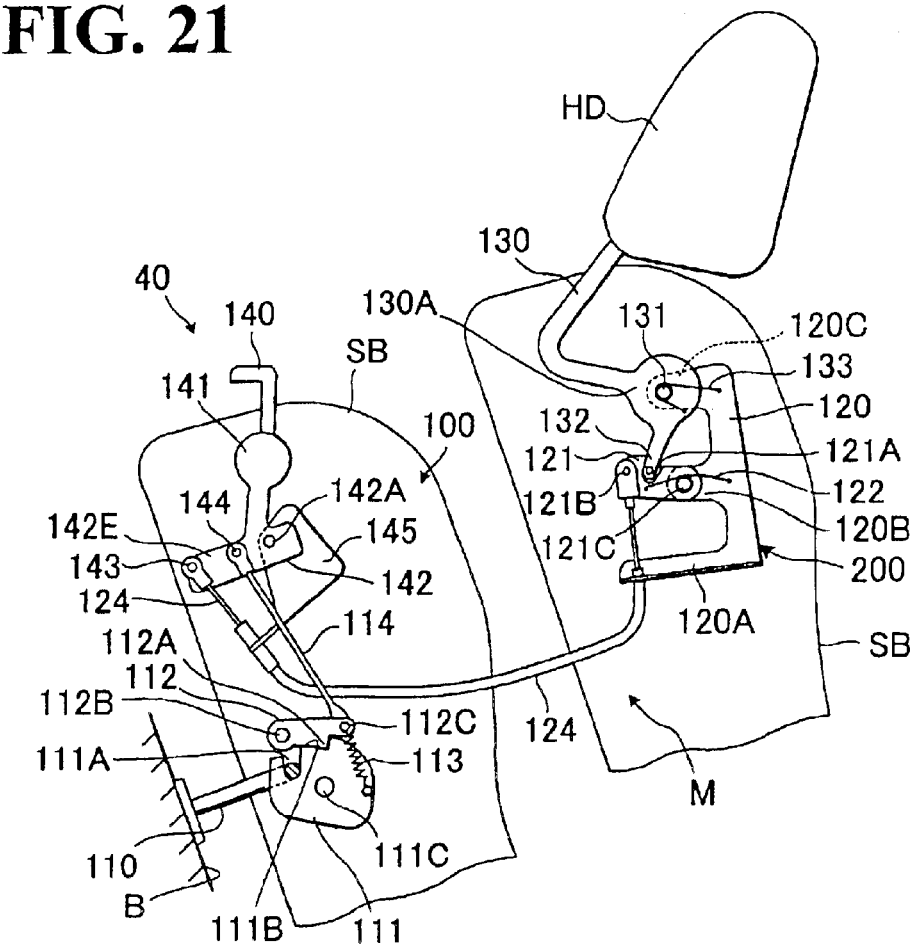
FIG. 21 is a diagram showing the seat back lock mechanism and a headrest lock mechanism in accordance with the third embodiment.

Accordingly, in the thus-constructed seat back lock mechanism (200), the lock piece (132) is normally retained in engagement with the engagement notch (121A) of the hook-like latch member (121), as shown in FIG. 21, due to the above-described biasing effects of both two biasing springs (133) (122). Under that state, the headrest (HD) is locked at the generally upright use position as in the FIG. 21.

On the other hand, designation (100) represents a seat back lock mechanism for locking and unlocking the seat back (SB) to and from a striker (110) fixed to the vehicle body (B). As shown, the seat back lock mechanism (100) is comprised of: an operation lever (40); a lock bracket (112) connected via a connecting rod (114) with the operation lever (40); and a latch (111).

Specifically, the operation lever (40) is formed to have a knob portion (140), an intermediate lever portion (141) and an actuator lever portion (142). The knob portion (140) is exposed outwardly from the seat back (SB) as can be seen from FIGS. 1 and 21. The actuator lever portion (142) is rotatably secured by a pin (142A) to a first securing support plate (145) fixedly provided in the upper portion of the seat back (SB). Thus, the knob portion (140) is rotatable about the pin (142A) forwardly and backwardly. While not shown, there may be provided a biasing spring and a stopper in association with the operation lever (40). That is, though not shown, the biasing spring is connected between the actuator lever portion (142) and the securing support plate (145) so as to bias the actuator lever portion (142) in the anticlockwise direction and thereby retain the same in the normal inoperative position as in FIG. 21, where the actuator lever portion (142) is abutted against the stopper.

Figure 20:
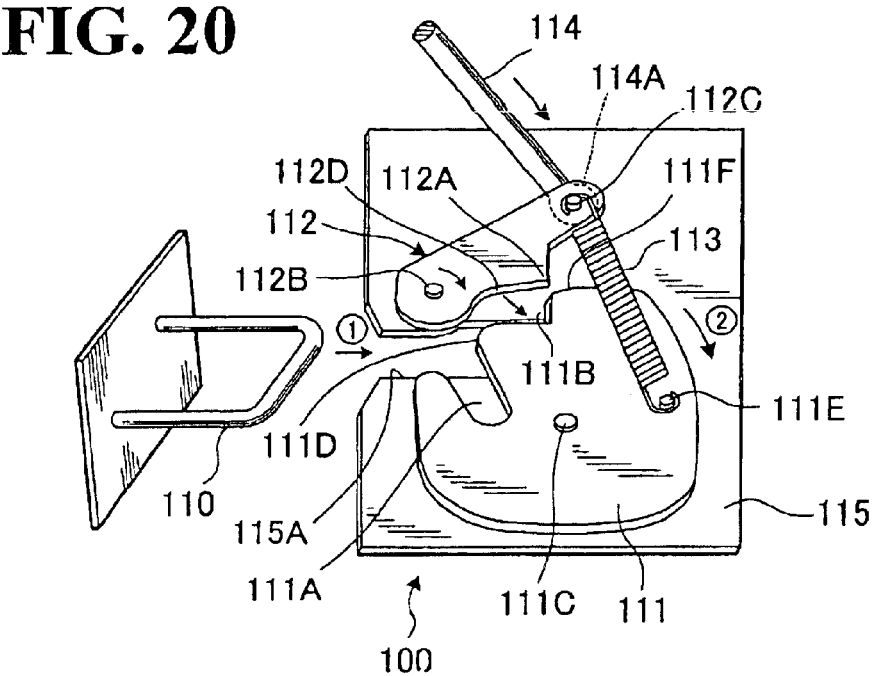
FIG. 20 is a partly broken perspective view of a striker and a part of seat back lock mechanism provided in the third embodiment.

As understandable from FIGS. 20 and 21, a second securing support plate (115) is fixedly provided within the upper portion of seat back (SB) at a point lower than the foregoing first securing support plate (145). The second securing support plate (115) is disposed adjacent to the back side of seat back (SB) and has a horizontally extending elongated cut-out portion (115A) adapted for allowing ingress and egress of the striker (110) therethrough. As best shown in FIG. 20, rotatably arranged on that second securing support plate (115) are the latch (111) and lock bracket (112) in such a manner that the latch (111) and lock bracket (112) are disposed on the opposite sides of the elongated cut-out portion (115A).

As best shown in FIG. 20, the latch (111) is so formed to have: a lock engagement notch (111A); an engagement cut-out portion (111B); a protrudent portion (111D) defined between the lock engagement notch (111A) and engagement cut-out portion (111B); and a stopper edge portion (111F) contiguous with the engagement cut-out portion (111B). It is seen that the lock engagement notch (111A) and engagement cut-out portion (111B) are defined in one end of the latch (111), whereas a spring securing piece (111E) is defined in another end of the latch (111). As shown, this latch (111) is rotatably supported substantially at its center by a support pin (111C) fixed to the securing support plate (115).

On the other hand, the lock bracket (112) is formed with an engagement projection (112A) in the intermediate region thereof and also formed with an abutment edge portion (112D). Both engagement projection (112A) and abutment edge portion (112D) in the aggregate correspond substantially in shape to a contour of the foregoing engagement cut-out portion (111B) of latch (111). Also, the lock bracket (112) is formed with a connecting pin (112C) in the free end portion thereof, the connecting pin (112C) projecting from both two sides of that free end portion of lock bracket (112) for a purpose to be set forth. As illustrated, this lock bracket (112) is rotatably supported, at the base end portion thereof, by a support pin (112B) fixed to the securing support plate (115).

With that structure, a spring (113) is connected between the spring securing pieces (111E) of latch (111) and the connecting pin (112C) of lock bracket (112), so that the lock bracket (112) is biasingly caused to rotate clockwise about the pin (112B), while simultaneously, the latch (111) is biasingly caused to rotate anticlockwise about the pin (111C), thereby normally retaining the engagement projection (112A) in engagement with the engagement cut-out portion (111B). As seen in FIG. 21, one end of the connecting rod (114) is pivotally connected with a pin (144) fixed to the actuator lever portion (142) of with the connecting pin (112C) of lock bracket (112). It is seen that the pin (144) or the connection point of the connecting rod (114) is disposed near to the rotation center (at 142A) of the actuator lever portion (142).

Accordingly, it is to be seen that anticlockwise or forward rotation of the operation knob (140) causes the connecting rod (114) to move upwardly, which in turn causes anticlockwise rotation of the lock bracket (112) out of engagement with the engagement cut-out portion (111B).

In the present embodiment also, the interlocking means (M) is provided between the headrest lock mechanism (200)

and the seat back lock mechanism (100). The interlocking means (M) may comprise a cable (124) and an extension region (142E) defined in the free end of the actuator lever portion (142) of operation lever (40). As shown, one end of the cable (124) is pivotally connected via a pin (143) with such extension region (142E) associated with the seat back lock mechanism (100). On the other hand, another end of the cable (124) is pivotally connected via a pin (121B) with the free end of the hook-like latch member (121) associated with the headrest lock mechanism (200). It is seen that the pin (143) or the connection point of the cable (124) is disposed a great distance from the rotation center (at 142A) of the actuator lever portion (142) in comparison with the connection point (at 144) of the connecting rod (114). Therefore, in view of a circle along which the connecting rod connection point (at 144) is to be moved about the rotation center (142A) and a circle along which the cable connection point (at 143) is to be moved about the rotation center (142A), it is to be seen that a radius between the cable connection point (at 143) and rotation center (142A) is larger than a radius between the connecting rod connection point (at 144) and rotation center (142A). Hence, upon rotation of the actuator lever portion (142) in an unlocking direction (as in the arrow ① in FIG. 22), the cable (124) moves an amount greater than the connecting rod (114), so that the headrest lock mechanism (200) connected with the cable (142) starts to be operated in advance before the seat back lock mechanism (100) connected with the connecting rod (114) is operated.

Figures 22, 23:
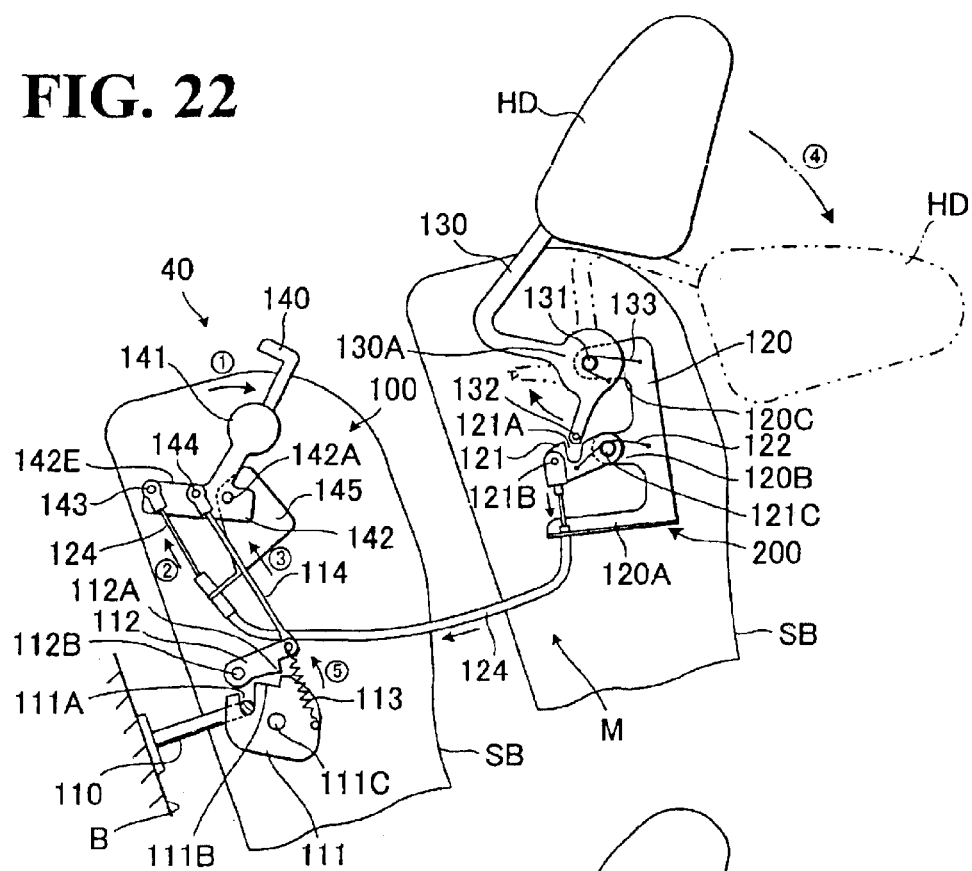
FIG. 22 is a diagram similar to the FIG. 21, which explanatorily shows unlocking operation of both seat back lock mechanism and headrest lock mechanism.
FIG. 23 is a diagram similar to the FIG. 21, which explanatorily shows unlocking and locking operation of both seat back and headrest lock mechanisms.

In operation, with reference to FIG. 22, when the operation knob (140) is rotated forwardly as indicated by the arrow ①, the actuator lever portion (142) is simultaneously rotated clockwise about the pin (142A). At this point, the cable (124) is first drawn as indicated by the arrows, which in turn causes anticlockwise rotation of the latch member (121) out of engagement with the lock piece (132) integral with the headrest stay (130), whereupon the headrest (HD) is released from the locked state. Concurrently therewith, under the biasing force of the spring (133), the headrest (HD) is automatically rotated or inclined forwardly as indicated by the arrow ④ to the non-use storage position indicated by the two-dot chain lines. Thereafter, further forward rotation of the operation knob (140) in the same direction as the arrow ① causes upward movement of the connecting rod (114) as indicated by the arrow ③, thereby causing the lock bracket (112) to rotate in the anticlockwise direction as indicated by the arrow ⑤, overcoming the biasing force of the spring (113), so that the engagement projection (112A) of lock bracket (112) is disengaged from the engagement cut-out portion (111B), as in FIG. 22. It is noted here that the spring (113) is naturally stretched, but, at this point, the stretched spring (113) does not generate a contracting force enough to rotate the latch (111) anticlockwise, which means that there is no disengagement of the latch (111) form the striker (110) until the headrest (HD) reaches the non-use storage position indicated by the two-dot chain lines.

Then, as shown in FIG. 23, still further forward rotation of the operation knob (140) in the direction of arrow ⑥ results in stretching the spring (113) upwardly to a maximum degree, which in turn generates a strong contracting force of the spring (113) enough to rotate the latch (111) anticlockwise as indicated by the arrow ⑦. Consequently, as in the FIG. 23, under such increased contracting force of spring (113), the lock engagement notch (111A) of latch (111) is now brought out of engagement with the striker (110), while at the same time, the abutment edge portion (112D) of lock bracket (112) is brought to a fit engagement with the stopper edge portion (111F) of latch (111). In this regard, due to such engagement between the abutment edge portion (112D) and stopper edge portion (111F) as well as due to the increased contracting force of spring (113), the latch (111) per se is positively retained against rotation, such that the lock engagement notch (111A) thereof is kept positioned at a point away from the striker (110) as can be seen from FIG. 23. Further, under that state, the connecting rod (114) is positively prevented against movement.

Figure 19:
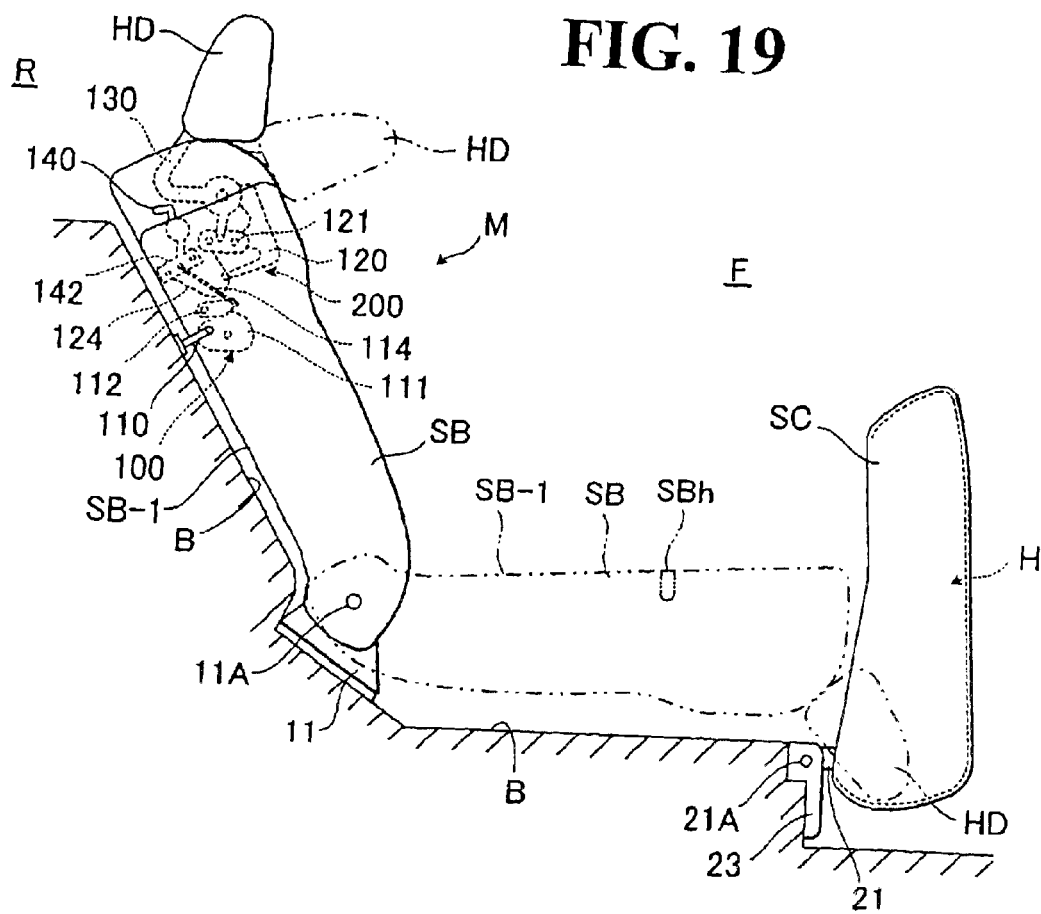
FIG. 19 is a side view of the third embodiment, which shows a principal part thereof and also shows the seat back as having been set in an upright storage position.

Then, the seat back (SB) is folded down, with the headrest (HD) set in the forwardly inclined storage position, in a direction to a horizontal non-use position, as indicated by the two-dot chain lines in FIG. 19. Of course, this is done on the understanding that the seat cushion (SC) has been flipped over about the pin (21A) to the upright storage positions by means of the interlocking means (M) described in the first and second embodiment for instance. Accordingly, as indicated in FIG. 19, when the seat back (SB) is set in the horizontal storage position of the two-dot chain lines, the headrest (HD) is stored in the hollow region (H) of the seat cushion (SC) set in the upright storage position.

Figure 18:
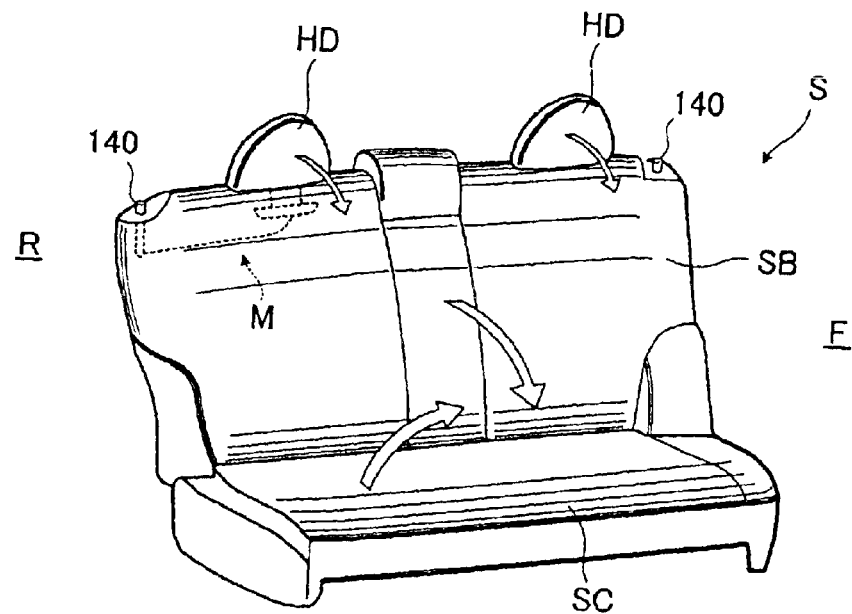
FIG. 18 is a schematic perspective view of a third embodiment of vehicle seat in accordance with the present invention.

When it is desired to return the thus-folded-down seat (S) into the normal use state as in FIG. 18, the seat back (SB) is rotated from the horizontal non-use position indicated by the two-dot chain line to the vertically extending use position indicated solid line in FIG. 19. At this point, as stated above, the operation knob (140) and latch (111) are retained in the unlocked state shown in FIG. 23, such that the former (140) is kept in the forwardly inclined state, while the lock engagement notch (111A) of the latter (111) is kept at a level below a line along which the striker (110) enters the back side of the seat back (SB) through the hole (SBh) adjacent to which the latch (111) is located. Therefore, referring to FIG. 23, with the backward rotation of the seat back (SB) as indicated by the arrow Q, the striker (110) enters the inside of seat back (SB) as indicated by the two-dot chain arrow and collides against the protrudent portion (111D) of latch (111). In other words, with particular reference to FIG. 20, the striker (110) enters the elongated cut-out portion (115A) of the second securing support plate (115) as indicated by the arrow ① and pushes the protrudent portion (111D) of latch (111). The latch (111) is thereby rotated about the pin (111C) in the clockwise arrow direction ②, while simultaneously, the striker (110) is engaged in the lock engagement notch (111A) as can be seen from FIG. 21. Shortly thereafter, the lock bracket (112) is rotated about the pin (112B) clockwise, thereby bringing the engagement projection (112A) thereof to engagement with the engagement cut-out portion (111B) of latch (111), while at the same time, a contracting force increased in the spring (113) draws the connecting rod (114) via the lock bracket (112) in the downward direction. Here, referring to FIG. 23, with such downward movement of connecting rod (114), the operation lever (40) as a whole is automatically rotated about the pin (142A) in the anticlockwise direction ⑧, while the cable (124) is moved back toward the headrest lock mechanism (200) as indicated by the arrow ⑨ due to the biasing force of spring (122) causing clockwise rotation of the hook-like latch member (121) in the arrow direction ⑩.

Accordingly, after having locked the seat back (SB) to the striker (110), a user can rotate the headrest (HD) back to the vertically extending or upright use position (in the solid lines) from the forwardly inclined position (in the tow-dot chain lines), as indicated by the arrow ⑪, bringing the lock piece (132) to engagement with the engagement notch (121A) of hook-like latch member (121), whereupon the headrest (HD) is locked at the use position as shown in FIG.

19. Of course, while not shown, the seat cushion (SC) may be automatically flipped over about the pin (21A) down to a horizontal use position as shown in FIG. 18, by means of the interlocking means (M) of the first and second embodiment.

In accordance with the present third embodiment, it is appreciated that the following effects are attained:

(i) By simply operating the operation lever (40), the headrest (HD) is first released from locked state at the upright use position and rotated to the forwardly inclined storage position, after which, the seat back (SB) is unlocked from the striker (110) and allowed to be folded down to the horizontal non-use position. This headrest mechanism is effective to the seat described in the first and second embodiments wherein the forward rotation of the seat back (SB) to the horizontal non-use position causes simultaneous flipping over of the seat cushion (SC) to the upright non-use position by means of the interlocking means (M). Because the forwardly inclined headrest (HD) at the non-use position does not project from the top of the seat back (SB) and therefore, the headrest (HD) is completely out of the way of the seat cushion (SC) being flipped over to the upright non-use position. Thus, there is no interference between the headrest (HD) and the seat back (SB) in this particular interlocking structure of seat.

(ii) The headrest (HD) is not allowed to be in the unlocked state until the seat back (SB) is completely locked to the striker (110), which advantageously eliminates the need for a user to ascertain whether the headrest (HD) is in unlocked state or not.

Figure 24:
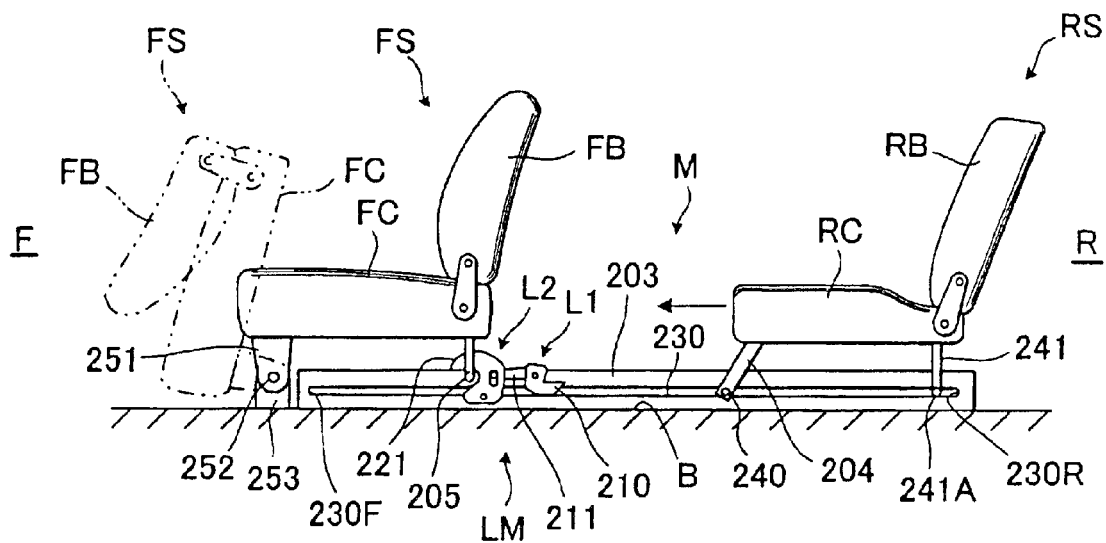
FIG. 24 is a fourth embodiment of the present invention.

Reference is now made to FIGS. 24 to 27 which illustrates a fourth embodiment of the present invention directed to two rear seats in a vehicle. According thereto, as shown in FIG. 24, the two rear seats may be a second seat (FS) and a third seat (RS) in combination with a slide rail (203) by way of example. The second seat (FS) is of a fold-down type where its seat cushion (FC) can be flipped over to such upright non-use position as indicated by the two-dot chain lines. As understandable from FIGS. 24 and 25, the slide rail (203) is of generally U-shaped cross-section having two vertical walls and two guide slots (230) (230) formed in the respective two vertical walls. The guide slots (230) form one element of the interlocking means (M) as will be explained later.

As shown, the second seat (FS) comprises a seat cushion (FC) and a seat back (FB) pivotally connected with the seat cushion (FC), wherein the seat cushion (FC) has a downwardly extending leg (251) fixed to the forward bottom region thereof and a downwardly extending striker (205) fixed to the backward bottom region thereof. The leg (251) is pivotally connected via a pin (252) with a support bracket (253) which is fixed on the floor (B) adjacent to the forward end of the long slide rail (203), so that the seat cushion (FC) of second seat (FS) can be rotated or flipped over forwardly and backwardly about the pin (252). While not shown, it may be so arranged that the seat cushion (FC) is biased by a spring in a direction to the upright non-use position, and that the seat back (FB) is provided with a lock mechanism and biased by a spring in a forward direction to the seat cushion (FC) in such a manner that, upon operation of the lock mechanism to an unlocking direction, the seat back (FB) is automatically folded by a biasing force of the spring onto the seat cushion (FC).

Figure 25:
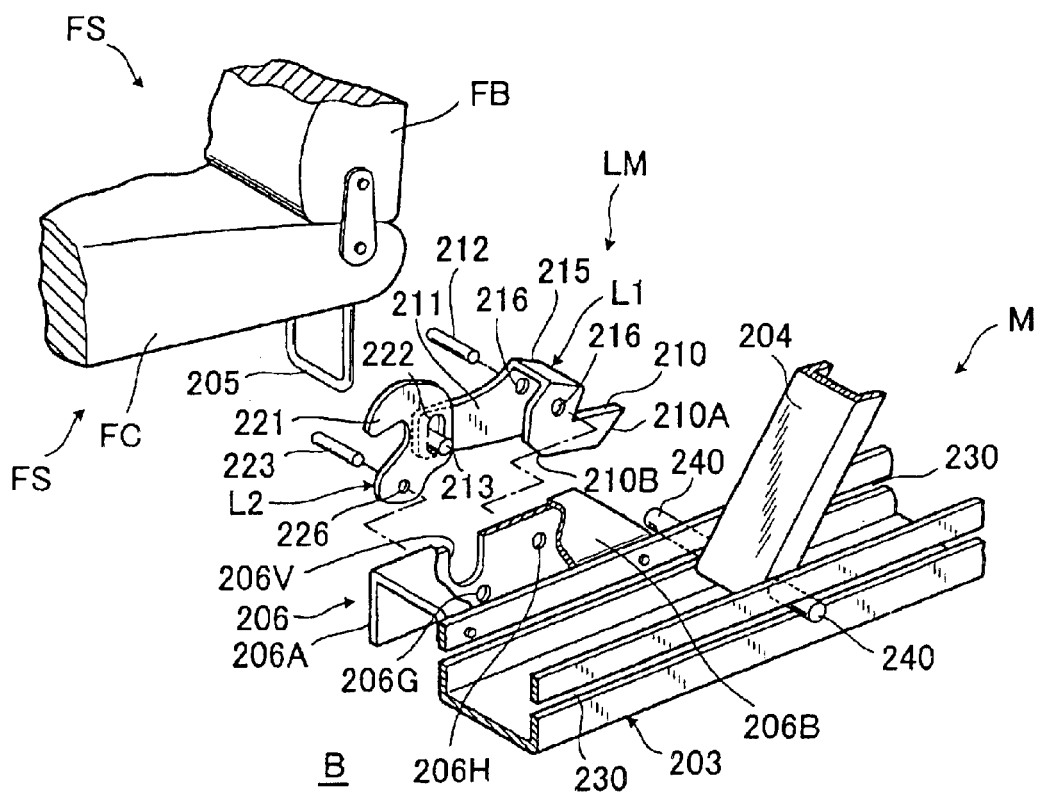
FIG. 25 is a partly broken and exploded perspective showing principal parts of the fourth embodiment.

The third seat (RS) comprises a seat cushion (RC) and a seat back (RB). As shown in FIG. 24, the seat cushion (RC) has, provided fixedly to the bottom thereof, a downwardly extending forward leg (204) and a downwardly extending backward leg (241). As shown, a slide pin (240) is fixed in the downward end portion of the forward leg (204) such that both two ends of the slide rod (240) project from the respective lateral sides of the forward leg (204). As best shown in FIG. 25, the slide pin (240) is slidably engaged in both two guide slots (230) of the long slide rail (203). The slide pin (240) form one element of the interlocking means (M) equivalent to the above-described slide rod (6) as will be explained later. The backward leg (241) also has a slide piece (241A) provided in the downward end thereof, the slide piece being slidably engaged in both of the two guide slots (230). Hence, the third seat (RS) is slidably movable on and along the long slide rail (203) in either of forward direction (to the side (F)) and backward direction (to the side (R)).

In this particular type of seat arrangement, the present embodiment utilizes an interlocking means (M) and a seat cushion lock mechanism (LM), both of which are basically similar in structure to the interlocking means (M) and the seat lock mechanism (LM) described in the first and second embodiments.

As stated earlier, the interlocking means (M) may comprise the guide slots (230) and the slide pin (240).

The seat lock mechanism (LM) is provided laterally of the long slide rail (203) at a point right behind the second seat (RS) as shown in FIG. 24. Specifically, the seat lock mechanism (LM) is comprised of a support bracket (206), a rotary actuator member (L1), and a rotary latch member (L2), wherein the rotary actuator member (L1) and rotary latch member (L2) are respectively similar in shape and structure to the afore-said rotary actuator member (7) and rotary latch member (8) of the first embodiment.

Figure 26:
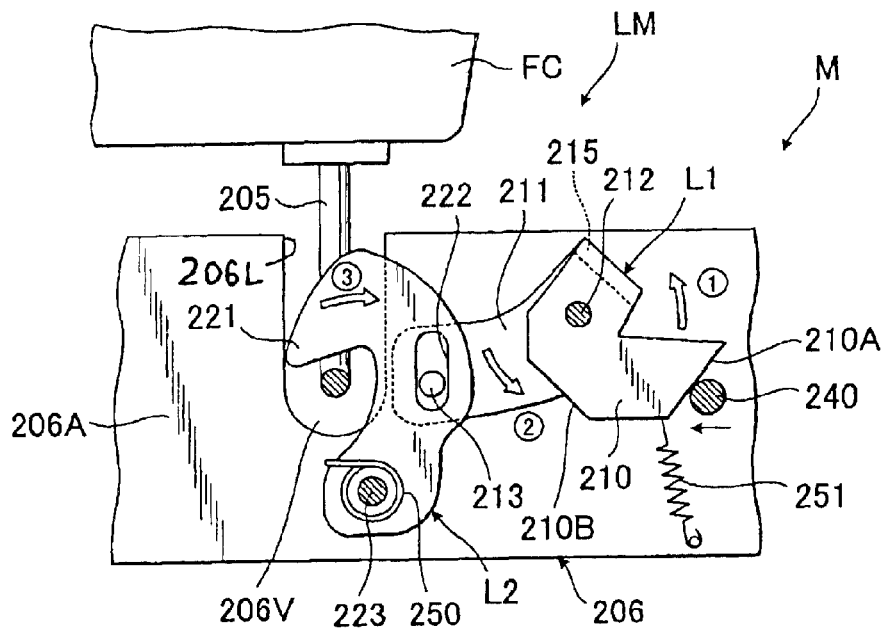
FIG. 26 is a diagram for explanatorily explaining unlocking operation of seat lock mechanism in the fourth embodiment to unlock a second seat therefrom.

As seen in FIGS. 25 and 26, the rotary actuator member (L1) is so formed to have a cam portion (210) and a connecting portion (211) such that the cam and connecting portions (210) (211) are integrally connected together by a piece (215) and extend horizontally in a direction opposite to each other. As viewed from FIG. 26, the cam portion (210) has an edge that slopes upwardly in one direction (rightward), in which edge, a first cam region (210A) is defined, and also has an edge that slopes upwardly in another opposite direction (leftward), in which edge, a second cam region (210B) is defined. As shown in FIG. 25, the connecting portion (211) has a connecting pin (213) formed in the free end portion thereof and a hole (216) formed in the base end portion thereof, whereas the cam portion (210) has a hole (216) formed in the base end portion thereof, such that those two holes (216) are coaxially aligned with each other.

On the other hand, as in FIG. 25, the rotary latch member (L2) is of the illustrated configuration having a hook-like latch end portion (221) defined in the free end thereof and a hole (226) formed in the base end thereof, with a vertically elongated hole (222) defined between the hook-like latch end portion (221) and the a hole (226).

The support bracket (206) is formed by a vertically extending section (206A) and a horizontally extending section (206B). As shown in FIG. 25, the horizontally extending section (206B) is fixedly attached to one vertical lateral wall of the slide rail (203), so that the support bracket (206) is disposed laterally of the slide rail (203). The vertically extending section (206A) has, formed therein, a vertically extending cut-out portion (206V), a first hole (206G) and a second hole (206H), wherein the first hole (206G) is disposed below the vertically extending cut-out portion (206V) and the second hole (206H) disposed above a line along which the guide slots (230) extend, as can be seen from FIGS. 25 to 27. Further, as understandable from FIGS. 26 and 27, a horizontally cut-out portion (206L) is formed in the horizontally extending section (206B) in communication with the vertically cut-out portion (206V). Those two cut-out portion (206V) (206L) are adapted to allow ingress and egress of the striker (205) of the second-seat seat cushion (FC) therethrough.

As understandable from FIGS. 25 and 26, a first pin (223) is inserted through the hole (226) of the rotary latch member (L2) and fixed in the first hole (206G), so that the rotary latch member (L2) is rotatably supported by the first pin (223) at a side laterally of the support bracket (206), whereas a second pin (212) is inserted through the two holes (216) of the rotary actuator member (L1) and fixed in the second hole (206H), so that the rotary actuator member (L1) is rotatably supported by the second pin (212) at a side laterally of the support bracket (206). As shown, the connecting pin (213) of the rotary actuator member (L1) is slidably inserted in the vertically elongated hole (213) of the rotary latch member (L2). Likewise as in the first embodiment, as in FIG. 26, the rotary latch member (L2) is biasingly caused by a spring (250) to rotate in the anticlockwise direction, while on the other hand, the rotary actuator member (L1) is biasingly caused by a spring (251) to rotate in the clockwise direction. Accordingly, the rotary latch member (L2) itself is normally held at the position where the hook-like latch end portion (221) is normally disposed at a point substantially corresponding to the cut-out portions (206V) (206L) for engagement with the striker (20) as will be explained. Under that state, both cam and connecting portions (210) (211) of the rotary actuator member (L1) are in the state of extending horizontally and rectilinearly along the longitudinal direction of the support bracket (206) or the long slide rail (203).

It is appreciated that, in this fourth embodiment also, the whole height-wise thickness of the seat cushion lock mechanism (LM) is substantially equal to that of the long slide rail (203), thereby advantageously allowing the height of both two seats (FS) (RS) to be reduced as required and avoiding interference with the foots of passenger.

FIG. 24 shows a normal seat use state where the second seat (FS) is locked to the long slide rail (203) or the vehicle floor (B) by means of the seat cushion lock mechanism (LM), and the third seat (RS) is position at a rearward point on the long slide rail (203). In operation, when the third seat (RS) is moved on and along the long slide rail (203) forwardly (to the side (F)), the slide pin (240) is brought to contact with the first cam region (210A) of rotary actuator member cam portion (210), whereupon both cam and connecting portions (210) (211) of rotary actuator member (L1) are rotated about the pin (212) in their respective anticlockwise directions ① and ② to cause simultaneous rotation of the rotary latch member (L2) in the clockwise direction ③. As a result thereof, the seat cushion lock mechanism (LM) is placed in an unlocked state where the hook-like latch portion (221) withdraws from a point corresponding to the cut-out portions (206V) (206L), thereby providing an opened space therein. Thus, the striker (205) is now out of engagement with the rotary latch member (L2). At that moment, preferably, the second-seat seat cushion (FC) is automatically flipped over about the pin (252) by a spring (not shown). In any case, the striker (205) is moved upwardly away from the seat cushion lock mechanism (LM) with the flipping over of seat cushion (FC) or the second seat (FS) toward the generally upright non-use position as indicated in FIG. 24. Then, with further forward moment of the third seat (RS), the slide pin (240) moves past the lock mechanism (LM) forwardly along the guide slots (230) of long slide rail (203), thereby allowing the third seat (RS) to reach the forward end point of the long slide rail (203) where the first seat (FS) has been set. Of course, the rotary actuator and latch members (L1) (L2) are automatically returned to their horizontally extending and upright states, as in FIG. 26, under the biasing forces of the respective two springs (223) (251). When the third seat (RS) reaches the foregoing forward end point of long slide rail (203), a widened space is obtained therebehind, which may be used as load-carrying platform or the like.

Figure 27:
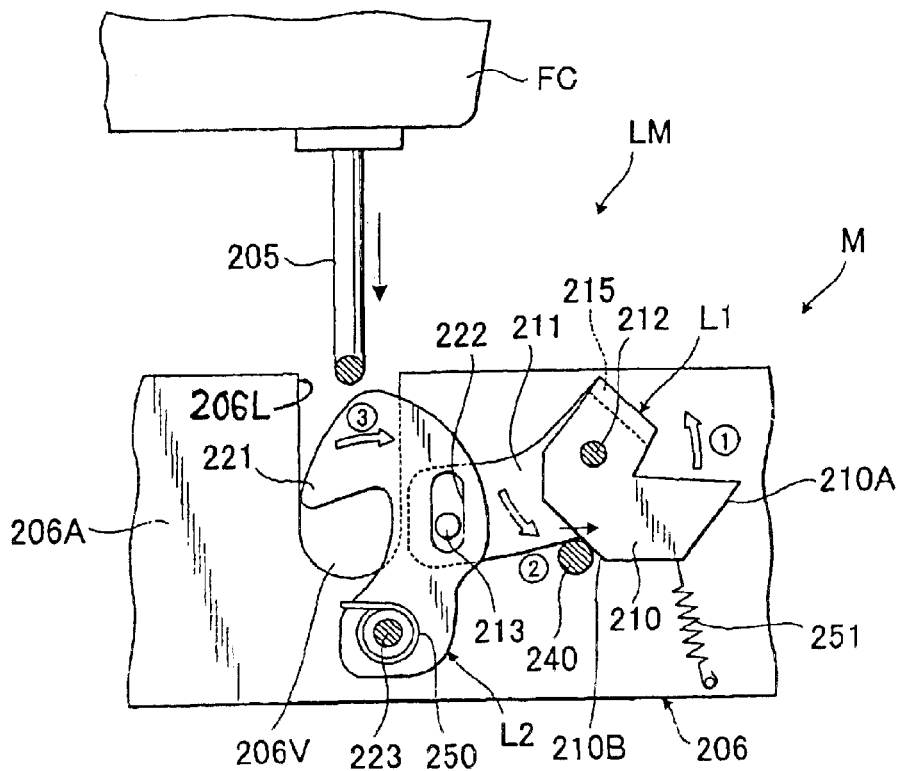
FIG. 27 is a diagram for explanatorily explaining unlocking operation of seat lock mechanism in the fourth embodiment in order to allow the second seat to be locked by the seat lock mechanism.

Conversely, as shown in FIG. 27, when the third seat (RS) is moved backwardly from the foregoing forward end point of long slide rail (203), the slide pin (240) is also moved backwardly as indicated by the arrow and brought to contact with the second cam region (210B), thereby causing anticlockwise rotation of both cam and connecting portions (210) (211) of rotary actuator member (L1) as indicated by the arrows ① and ②. As a result thereof, the rotary latch member (L2) is rotated in the clockwise direction ③ against the biasing force of the spring (223), so that the hook-like engagement portion (221) is moved away from both two cut-out portions (206V) (206L). Hence, at that moment, the second seat (FS) is flipped over backwardly from the upright non-use storage state indicated by the two-dot chain line as in FIG. 24 down to the horizontal use position indicated by the solid line, so that the striker (205) enters the cut-out portions (206V) (206L). Thereafter, with further backward movement of the third seat (RS), the slide pin (240) moves past the rotary actuator member (L1) backwardly, with the result that the rotary actuator member (L1) is automatically rotated clockwise under the biasing force of the spring (251). Such biased clockwise rotation of rotary actuator member (L1) and the biasing force of the spring (250) work together to cause the rotary latch member (L2) to rotate anticlockwise, thereby bringing the hook-like engagement portion (221) of rotary latch member (L2) to engagement with the striker (205). In that way, the second seat (FS) is locked to the long slide rail (203) or the floor (B), and then, the third seat (RS) may be moved on and along the long slide rail (203) to the normal position shown in FIG. 24.

It is noted that the third seat (RS) may be constructed in the same way as in the second seat (FS) and disposed at the forward position where the second seat (FS) is disposed, whereas the second seat (FS) be constructed in the same way as in the third seat (RS) and disposed at the backward position behind the thus-arranged third seat (RS).

It is also noted that, instead of the second and third seats (FS) (RS), any other movable elements, such as a first console box and a second console box, may be arranged on the long slide rail (203) via the interlocking means (M) and lock mechanism (LM). While not shown, in the case of such first and second console boxes, it may be so arranged that the first console box is pivotally disposed at the forward end portion of the long slide rail (203) so as to be able to be flipped over forwardly and be in operative connection with the lock mechanism (LM) as shown in FIG. 24, and that the second console box is-slidably attached on the long slide rail (203), using the slide pin (240), at a point behind the first console box in the same manner as the third seat (RS).

In accordance with the present fourth embodiment, it is appreciated that the second seat (FS) is automatically locked and unlocked to and from the use position by the forward and backward movement of the third seat (RS) under the action of the interlocking means (M), i.e. the combination of the slide pin (240) and the rotary actuator and latch members (L1) (L2).

While having described the present invention thus far, it should be finally understood that the invention is not limited to the illustrated embodiments, but any other modification, replacement and addition may be applied thereto without departing from the scopes of the appended claims.

What is claimed is:

1. A vehicle seat in combination with a vehicle body, comprising:
    a seat cushion rotatably provided so as to be able to be rotated or flipped over between a horizontal use position and an upright storage position;
    a seat back rotatably with said vehicle body so as to be able to be rotated or flipped over between an upright use position and a horizontal storage position;
    an interlocking means operatively connected with said seat back and said seat cushion, said interlocking means including:
    a biasing means for biasingly causing said seat cushion to flip over to said upright storage position, said biasing means being so workable as to resiliently contract and extend in a direction;
    a link means having one end pivotally connected with said seat back and another end pivotally connected with said biasing means, and
    a guide means for guiding said biasing means so as to insure that the biasing means works in said direction,
    with such an arrangement that, upon folding said seat back from the upright use position down to the horizontal storage position, both said link means and said biasing means are moved via said guide means, thereby automatically rotating or flipping over said seat cushion from said horizontal use position to said upright storage position.

2. The vehicle seat as claimed in claim 1, which includes a lock means for locking and unlocking said seat cushion to and from said horizontal use position, said lock means being provided between said seat cushion and said vehicle body at a point below the seat cushion, with such an arrangement that, upon folding said seat back from said upright use position down to said horizontal storage position, said lock means is automatically operated by said interlocking means to unlock said seat cushion from the horizontal use position, and thus, said seat cushion is automatically caused by said biasing means to flip over from said horizontal use position to said upright storage position.

3. The vehicle seat as claimed in claim 2, wherein said interlocking means is arranged laterally of both said seat back and said seat cushion and disposed below said seat cushion.

4. The vehicle seat as claimed in claim 2, wherein said seat cushion is rotatably connected with said vehicle body at one end portion thereof which is disposed forwardly of said vehicle body, wherein said seat back is rotatably connected with said vehicle body at a lower end portion thereof, and wherein another lock means is provided for locking and unlocking said seat back to and from said upright use position.

5. The vehicle seat as claimed in claim 2, wherein said lock means comprises, a striker provided in said seat cushion; a rotary latch member provided to said vehicle body so as to be rotable in a first direction for engagement with said striker and in a second direction for disengagement from said striker; and a rotary actuator member rotatably provided for causing rotation of said rotary latch member in one of said first and second directions in conjunction with said interlocking means.

6. The vehicle seat as claimed in claim 2, wherein said interlocking means includes a link means having one end pivotally connected with said seat back, and wherein said biasing means comprises an elastically contractible/extendable biasing mechanism which is connected at one end thereof with another end of said link member and also connected at another end thereof with said seat cushion.

7. The vehicle seat according to claim 6, wherein said elastically contractible/extendable biasing mechanism comprises: a body connected with said another end of said link means;
    a rod movably provided in said body so as to move in an outward direction therefrom and in an inward direction thereinto, said rod being connected with said seat cushion-, and an elastic biasing element provided in said body for biasingly causing said rod to move in said outward direction.

8. The vehicle seat as claimed in claim 2, wherein said lock means comprises—a striker provided in said seat cushion, a rotary latch member provided at a side of said vehicle body so as to be ratable in a first direction for engagement with said striker and in a second direction for disengagement from said striker, and a rotary actuator member rotatably provided for causing rotation of said rotary latch member in one of said first and second directions in conjunction with said interlocking means, wherein said interlocking means includes a link means having one end pivotally connected with said seat back, and wherein said biasing means comprises an elastically contractible/extendable biasing mechanism which is connected at one end thereof with another end of said link member and also connected at another end thereof with said seat cushion, and wherein said interlocking means further includes a slide pin connected between said link means and said elastically contractible/extendable biasing mechanism, said slide pin being so slidably provided as to slidingly move toward and away from said rotary actuator member, with such an arrangement that, when said seat back is folded from said upright use position down to said horizontal storage position, said slide pin moves toward and contacts said rotary actuator member, thereby causing rotation of the rotary latch member in said second direction for disengagement from said striker.

9. The vehicle seat according to claim 8, which further comprises a guide means provided on said vehicle body, said guide means being adapted for allowing slidable movement of said slide pin therealong.

10. The fold-down vehicle seat as claimed in claim 1, wherein said biasing means comprises an elastically contractible/extendable biasing mechanism consisting essentially of: a body connected with said another end of said link means, a rod movably provided in said body so as to move in an outward direction therefrom and in an inward direction thereinto, said rod being connected with said seat cushion, and an elastic biasing element provided in said body for biasingly causing said rod to move in said outward direction.

11. The vehicle seat according to claim 10, wherein said elastically contractible/extendable basing mechanism comprises a pneumatic or hydraulic cylinder.

12. The vehicle seat as claimed in claim 1, wherein said biasing means and said link means are operatively connected with said seat back and said seat cushion in such a manner that, when said seat back is folded down substantially to a midway point between said upright use position and said horizontal storage position, said seat cushion is flipped over by said biasing and link means to said upright storage position, and, with further folding down of said seat back from said midway point to said horizontal storage position, the seat cushion is positively retained at the upright storage position under a biasing force of said biasing means.

13. The vehicle seat as claimed in claim 1, wherein said seat cushion is rotatably connected with said vehicle body at one end portion thereof which faces in a direction forwardly of said vehicle body, wherein said seat back is rotatably connected with said vehicle body at a lower end portion thereof which forms a center of rotation of the seat back, and wherein said link means is pivotally connected, at said one end thereof, with said seat back at a point above said center of rotation of the seat back.

14. The vehicle seat according to claim 1, wherein said link means comprises at least one link member of generally "L" shape.

15. The vehicle seat as claimed in claim 1, wherein a lock means is provided for locking and unlocking said seat back to and from said vehicle body.

* * * * *